United States Patent
Kim et al.

(10) Patent No.: US 11,746,289 B2
(45) Date of Patent: Sep. 5, 2023

(54) INP-BASED NANOCLUSTER, AND METHOD OF PREPARING INP-BASED NANOPARTICLE

(71) Applicants: SAMSUNG ELECTRONICS CO., LTD., Suwon-si (KR); POSTECH Research and Business Development Foundation, Pohang-si (KR)

(72) Inventors: Yong Wook Kim, Yongin-si (KR); Yong Ju Kwon, Gyeongsangbuk-do (KR); Sungjee Kim, Pohang-si (KR); Jihyun Min, Seoul (KR); Yuho Won, Seoul (KR); Eun Joo Jang, Suwon-si (KR); Hyo Sook Jang, Suwon-si (KR); Eunjae Lee, Busan (KR); Kyuhyun Bang, Seoul (KR); Anastasia Agnes, Pohang-si (KR); Jeongmin Kim, Ulsan (KR)

(73) Assignees: SAMSUNG ELECTRONICS CO., LTD., Gyeonggi-Do (KR); POSTECH, RESEARCH AND BUSINESS DEVELOPMENT FOUNDATION, Gyeongsangbuk-Do (KR)

( * ) Notice: Subject to any disclaimer, the term of this patent is extended or adjusted under 35 U.S.C. 154(b) by 0 days.

(21) Appl. No.: 17/407,260

(22) Filed: Aug. 20, 2021

(65) Prior Publication Data
US 2022/0056338 A1    Feb. 24, 2022

(30) Foreign Application Priority Data
Aug. 20, 2020 (KR) .................. 10-2020-0104843

(51) Int. Cl.
| | |
|---|---|
| C09K 11/72 | (2006.01) |
| C09K 11/70 | (2006.01) |
| C09K 11/08 | (2006.01) |
| C01B 25/08 | (2006.01) |
| B82Y 40/00 | (2011.01) |
| B82Y 20/00 | (2011.01) |

(52) U.S. Cl.
CPC ............ *C09K 11/72* (2013.01); *C01B 25/087* (2013.01); *C09K 11/0883* (2013.01); *C09K 11/70* (2013.01); *B82Y 20/00* (2013.01); *B82Y 40/00* (2013.01); *C01P 2002/54* (2013.01); *C01P 2002/72* (2013.01); *C01P 2004/04* (2013.01); *C01P 2004/50* (2013.01); *C01P 2004/64* (2013.01)

(58) Field of Classification Search
CPC ..... C09K 11/72; C09K 11/0883; C09K 11/70; B82Y 20/00; B82Y 40/00
See application file for complete search history.

(56) References Cited

U.S. PATENT DOCUMENTS

2019/0382656 A1*  12/2019  Mocatta ............... C09K 11/025
2020/0102494 A1*   4/2020  Mocatta ............. C09K 11/0811

FOREIGN PATENT DOCUMENTS

WO    WO 2020/154511    *  7/2020

OTHER PUBLICATIONS

Erga Shalev et al., "Guided CdSe Nanowires Parallelly Integratedinto Fast Visible-Range Photodetectors", ACS Nano 2017, 11, 213-220.
Haizheng Zhong et al., "Synthesis of Type II CdTe—CdSe Nanocrystal Heterostructured Multiple-Branched Rodsand Their Photovoltaic Applications", J. Phys. Chem. C 2007, 111, 6538-6543.
Ilan Gur et al., "Hybrid Solar Cells with PrescribedNanoscale Morphologies Based onHyperbranched SemiconductorNanocrystals", Nano Lett. 2007, 7, 409-414.
Jinhao Gao et al., "Ultrasmall Near-Infrared Non-cadmium Quantum Dots forin vivo Tumor Imaging", Small 2010, 6, 256-261.
Jiwoong Yang et al., "Advances in the Colloidal Synthesis of Two-DimensionalSemiconductor Nanoribbons", Chem. Mater. 2013, 25, 1190-1198.
Michael J. Bowers et al., "White-Light Emission from Magic-Sized Cadmium Selenide Nanocrystals", J. Am. Chem. Soc 2005, 127, 15378-15379.
Miri Kazes et al., "Lasing from Semiconductor Quantum Rodsin a Cylindrical Microcavity", Adv. Mater. 2002, 14, 317-321.
Rifat A. M. Hikmet el al., "Polarized-Light-Emitting Quantum-Rod Diodes", Adv. Mater. 2005, 17, 1436-1439.
Sudarsan Tamang et al., "Tuning Size and Size Distribution of Colloidal InAs Nanocrystals viaContinuous Supply of Prenucleation Clusters on Nanocrystal Seeds", Chem. Mater. 2016, 28, 8119-8122.
Sungjun Koh et al., "Zinc-Phosphorus Complex Working as an Atomic Valve for ColloidalGrowth of Monodisperse Indium Phosphide Quantum Dots", American Chemical Society, Chem. Mater. 2017, 29, 6346-6355.
Vishwas Srivastava et al., "Monodisperse InAs Quantum Dots from Aminoarsine Precursors:Understanding the Role of Reducing Agent", Chem. Mater. 2018, 30, 3623-3627.

(Continued)

*Primary Examiner* — C Melissa Koslow
(74) *Attorney, Agent, or Firm* — CANTOR COLBURN LLP

(57) ABSTRACT

The invention relates to InP-based nanoclusters that include indium and phosphorus and further include zinc, chlorine, or a combination thereof, and to a method of preparing the InP-based nanoparticles including heating the InP-based nanoclusters in the presence of zinc, chlorine, or a combination thereof.

19 Claims, 13 Drawing Sheets

(56) References Cited

OTHER PUBLICATIONS

Wangyang Fu et al., "Ferroelectric Gated Electrical Transport in CdS Nanotetrapods", American Chemical Society, Nano Lett. 2011, 11, 1913-1918.
Wanli Ma et al., "Photovoltaic Performance of UltrasmallPbSe Quantum Dots", ACS Nano 2011, vol. 5, No. 10, 8140-8147.
Yi Cui et al., "Miri Kazes et al., "Lasing from Semiconductor Quantum Rodsin a Cylindrical Microcavity", Adv. Mater. 2002, 14, 317-321", Nano Lett. 2005, 5, 1519-1523.
Yongju Kwon, et al., "Synthesis of InP branched nanostructures bycontrolling the intermediate nanoclusters", J. Mater. Chem. C. 2020, vol. 8, Issue 3, pp. 1118-1124.
Yu Huang et al., "Logic Gates and Computationfrom Assembled NanowireBuilding Blocks", Science 2001, 294, 1313-1317.
Yuanyuan Wang et al., "Magic-Size II-VI Nanoclusters as Synthons for Flat ColloidalNanocrystals", Inorg. Chem. 2015, 54, 1165-1177.
Zheheng Xu et al., "Formation of Size-Tunable and Nearly Monodisperse InPNanocrystals: Chemical Reactions and Controlled Synthesis", Chem. Mater. 2019, 31, 5331-5341.

\* cited by examiner

INP-BASED NANOCLUSTER, AND METHOD OF PREPARING INP-BASED NANOPARTICLE

CROSS-REFERENCE TO RELATED APPLICATION

This application claims priority under 35 U.S.C. § 119 to Korean Patent Application No. 10-2020-0104843 filed in the Korean Intellectual Property Office on Aug. 20, 2020, the content of which is incorporated herein by reference in its entirety.

BACKGROUND

1. Field

InP-based nanoclusters, and a method for preparing InP-based nanoparticles are disclosed.

2. Description of the Related Art

Research results have been reported that semiconductor nanoclusters with a size of less than or equal to about 2 nanometers (nm), may be reactive intermediates in the growth path of semiconductor nanoparticles, and therefore, may play an important role in the growth mechanism of semiconductor nanoparticles. Nanoclusters may form by different reaction pathways as monomers necessary for growth of the nanoparticles are consumed in the synthetic process. At times, the process may lead to the generation of heterogeneous nanoparticles. Recently, to address this problem, attempts have been made to use a precursor nanocluster as a reactive intermediate for the preparation of semiconductor nanoparticles.

Unlike cadmium chalcogenide-based nanoclusters, which tend to form quite readily during the synthetic process, Group III-V covalent nanoparticles such as InP form more slowly because the bonding energy between indium and phosphorus, and between indium and ligand, is relatively strong. As a result, the thermodynamic stability of the nanocluster is relatively high and so nanoclusters can be experimentally observed in the synthetic process. There is a demand for separating, synthesizing, and identifying select nanoclusters, which are considered as intermediates in the synthesis of Group III-V nanoparticles, for the development of Group III-V nanoparticles with high homogeneity or control of the shape of the nanostructure of the nanoparticles.

SUMMARY

An embodiment provides InP-based nanoclusters.

Another embodiment provides a method for preparing InP-based nanoparticles using the InP-based nanoclusters.

InP-based nanoclusters according to an embodiment include indium (In) and phosphorus (P), and further include zinc (Zn) and/or chlorine (Cl).

The InP-based nanoclusters may include indium, phosphorus, and zinc.

The InP-based nanoclusters including indium, phosphorus, and zinc may exhibit a maximum absorption peak at a wavelength of about 393 nm.

The InP-based nanoclusters exhibiting the maximum absorption peak at the wavelength of about 393 nm may have a half-width at half-maximum (HWHM) of the maximum emission peak of less than or equal to about 15 nm.

The InP-based nanoclusters including indium, phosphorus, and zinc may exhibit a maximum absorption peak at a wavelength of about 408 nm.

The InP-based nanoclusters exhibiting the maximum absorption peak at the wavelength of about 408 nm have a half-width at half-maximum (HWHM) of the maximum emission peak of less than or equal to about 20 nm.

The InP-based nanoclusters including indium, phosphorus, and zinc may exhibit a maximum absorption peak at a wavelength of about 360 nm.

The InP-based nanoclusters exhibiting the maximum absorption peak at the wavelength of about 360 nm may have a half-width at half-maximum (HWHM) of the maximum emission peak of less than or equal to about 30 nm.

The InP-based nanoclusters including indium, phosphorus, and zinc may include Zn in an amount of about 10 mol % to about 40 mol % relative to moles of In.

The InP-based nanoclusters may include indium, phosphorus, and chlorine.

The InP-based nanoclusters including indium, phosphorus, and chlorine may exhibit a maximum absorption peak at a wavelength of about 399 nm.

The InP-based nanoclusters exhibiting the maximum absorption peak at the wavelength of about 399 nm may have a half-width at half-maximum (HWHM) of the maximum emission peak of less than or equal to about 10 nm.

The InP-based nanoclusters including indium, phosphorus, and chlorine may exhibit a maximum absorption peak at a wavelength of about 360 nm.

The InP-based nanoclusters including indium, phosphorus, and chlorine may include Cl in an amount of less than or equal to about 90 mol % relative to moles of In.

The InP-based nanoclusters including indium, phosphorus, and chlorine may include Cl in an amount of less than or equal to about 88 mol % relative to moles of In.

The InP-based nanoclusters including indium, phosphorus, and chlorine may include Cl in an amount of less than or equal to about 67 mol % relative to moles of In.

The InP-based nanoclusters may include both zinc and chlorine.

A method of preparing InP-based nanoparticles according to another embodiment includes heating InP-based nanoclusters according to an embodiment in an organic solvent.

The preparing method may further include heating the InP-based nanoclusters in the solvent while further adding a first precursor material including indium, a second precursor material including phosphorus, and optionally, adding a third precursor material including zinc, optionally, adding a fourth precursor material including chlorine, or optionally, adding the third and fourth precursors to the organic solvent as the first and the second precursors are heated in the organic solvent.

InP-based nanoclusters according to an embodiment can be described as thermodynamically stable, magic-sized nanoclusters, and using such magic-sized nanoclusters, InP-based nanoparticles having a homogeneous size and/or nanostructure controlled shape may be prepared. In addition, since the emission peaks of these nanoclusters range from 400 nm to about 800 nm including emission due to the trap level, the InP-based nanoclusters may be used as a light emitting body of a white light emitting diode (LED). Moreover, due to their relatively small size, they may be advantageous for use as an illuminant probe or agent in the in-vivo imaging field. Furthermore, they may be applied as a material that strongly absorbs sunlight in the solar cell field because they exhibit a strong quantum confinement effect.

DETAILED DESCRIPTION

Figure 1:
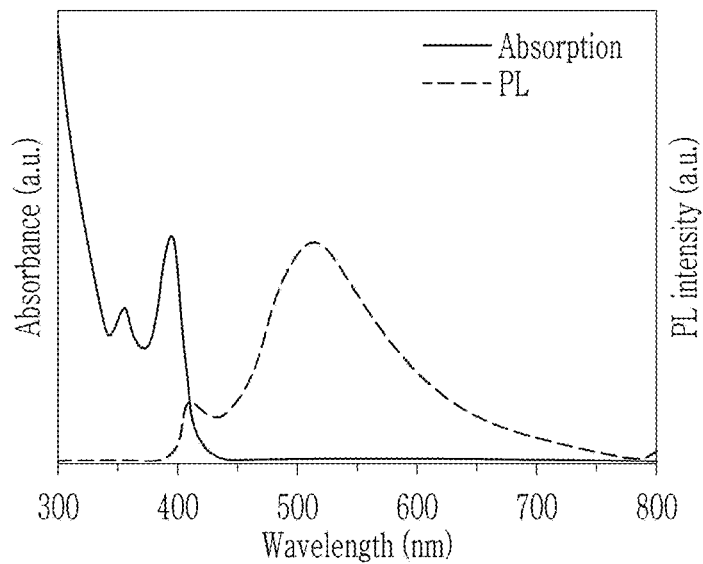
FIG. 1 is an absorption and emission spectrum of the F393-InP:Zn nanoclusters prepared in Example 1.

The advantages and features of the present disclosure and the methods for accomplishing the same will be apparent from the embodiments described hereinafter with reference to the accompanying drawings. However, the embodiments should not be construed as being limited to the embodiments set forth herein.

If not defined otherwise, all terms (including technical and scientific terms) in the specification may be defined as commonly understood by one of ordinary skill in the art to which this disclosure belongs. It will be further understood that the terms, such as those defined in a commonly-used dictionaries should be interpreted as having a meaning that is consistent with their meaning in the context of the relevant art and the present disclosure, and may not be interpreted ideally or exaggeratedly unless clearly defined.

In addition, unless explicitly described to the contrary, the word "comprise", and variations such as "comprises" or "comprising", will be understood to imply the inclusion of stated elements but not the exclusion of any other elements. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof. As used herein, the singular forms "a," "an," and "the" are intended to include the plural forms, including "at least one," unless the content clearly indicates otherwise. "At least one" is not to be construed as limiting "a" or "an." "Or" means "and/or." As used herein, the term "and/or" includes any and all combinations of one or more of the associated listed items.

In the drawings, the thickness of layers, films, panels, regions, etc., are exaggerated for clarity. Like reference numerals designate like elements throughout the specification. It will be understood that when an element such as a layer, film, region, or substrate is referred to as being "on" another element, it can be directly on the other element or intervening elements may also be present. In contrast, when an element is referred to as being "directly on" another element, there are no intervening elements present.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

As used herein, when a definition is not otherwise provided, "substituted" refers to replacement of hydrogen of a compound or a corresponding moiety by a substituent selected from a C1 to C30 alkyl group, a C2 to C30 alkenyl group, a C2 to C30 alkynyl group, a C6 to C30 aryl group, a C7 to C30 alkylaryl group, a C1 to C30 alkoxy group, a C1 to C30 heteroalkyl group, a C3 to C30 heteroalkylaryl group, a C3 to C30 cycloalkyl group, a C3 to C15 cycloalkenyl group, a C6 to C30 cycloalkynyl group, a C2 to C30 heterocycloalkyl group, a halogen (—F, —Cl, —Br, or —I), a hydroxy group (—OH), a nitro group (—NO$_2$), a cyano group (—CN), an amino group (—NRR', wherein R and R' are independently hydrogen or a C1 to C6 alkyl group), an azido group (—N$_3$), an amidino group (—C(=NH)NH$_2$)), a hydrazino group (—NHNH$_2$), a hydrazono group (=N(NH$_2$)), an aldehyde group (—C(=O)H), a carbamoyl group (—C(O)NH$_2$), a thiol group (—SH), an ester group (—C(=O)OR, wherein R is a C1 to C6 alkyl group or a C6 to C12 aryl group), a carboxyl group (—COOH) or a salt thereof (—C(=O)OM, wherein M is an organic or inorganic cation), a sulfonic acid group (—SO$_3$H) or a salt thereof (—SO$_3$M, wherein M is an organic or inorganic cation), a phosphoric acid group (—PO$_3$H$_2$) or a salt thereof (—PO$_3$MH or —PO$_3$M$_2$, wherein M is an organic or inorganic cation), and a combination thereof.

Herein, a "hydrocarbon group" refers to a group including carbon and hydrogen, having for example, 1 to 16 carbon atoms, and (e.g., alkyl, alkenyl, alkynyl, or aryl group). The hydrocarbon group may be a group having a monovalence or more formed by removal of one or more hydrogen atoms from alkane, alkene, alkyne, or arene. In the hydrocarbon group, at least one methylene may be replaced by an oxide moiety, a carbonyl moiety, an ester moiety, —NH—, or a combination thereof.

Herein, "alkyl" refers to a linear or branched saturated monovalent hydrocarbon group having, for example, 1 to 16 carbon atoms (methyl, ethyl hexyl, etc.).

Herein, "alkenyl" refers to a linear or branched monovalent hydrocarbon group having, for example, 2 to 16 carbon atoms, and one or more carbon-carbon double bond.

Herein, "alkynyl" refers to a linear or branched monovalent hydrocarbon group having, for example, 2 to 16 carbon atoms, and one or more carbon-carbon triple bond.

Herein, "aryl" refers to a group formed by removal of at least one hydrogen from an aromatic group, for example, 3 to 12 carbon atoms, and (e.g., a phenyl or naphthyl group).

Herein, "hetero" refers to one including 1 to 3 heteroatoms such as N, O, S, Si, P, or a combination thereof.

Herein, "Group" refers to a group of Periodic Table.

"Group I" refers to a Group IA and a Group IB, and includes Li, Na, K, Ru, and Cs, but is not limited thereto.

"Group II" refers to a Group IIA and a Group IIB, and examples of Group II may include Cd, Zn, Hg, and Mg, but are not limited thereto.

"Group III" may include a Group IIIA and a Group IIIB, and examples of Group III metals include Al, In, Ga, and Tl, but are not limited thereto.

"Group IV" may include a Group IVA and a Group IVB, and examples of Group IV metals may include Si, Ge, or Sn, but are not limited thereto.

"Group V" includes Group VA and includes nitrogen, phosphorus, arsenic, antimony, and bismuth, but is not limited thereto.

"Group VI" includes Group VIA and includes sulfur, selenium, and tellurium, but is not limited thereto.

As used herein, the term "metal" also includes a semimetal such as silicon (Si).

As used herein the term "-based" means "containing" (for example "InP-based nanoclusters" means nanocluster that contain InP.

Semiconductor nanoparticles have high luminous efficiency and have excellent durability against photobleaching compared to organic dye materials. In addition, it is possible to obtain a wide range of emission wavelengths from visible light to near-infrared light by adjusting the material composition and/or size of the nanoparticles. In particular, by selectively controlling sizes of the semiconductor nanoparticles, it is possible to implement various emission colors having narrow color purity. Research is being actively conducted to apply the optical properties of semiconductor nanoparticles to industrial and medical fields such as displays, solar cells, and as contrast agents in bio-imaging. Optical properties such as a full-width at half-maximum (FWHM) of light emission (or color purity), quantum efficiency, blinking of light emission, and photostability may be considered important characteristics in order to utilize semiconductor nanoparticles in the above stated fields.

The Group II-VI semiconductor nanoparticles based on cadmium chalcogenide, which is an ion-binding material, have excellent optical properties such as narrow luminescence FWHM and high quantum efficiency. However, they have their limitations in being applied throughout the industry due to cadmium be highly toxic.

In contrast, because Group III-V-based InP nanoparticles have relatively low biotoxicity and the emission wavelength band is in the visible light region, they are considered as a material to replace the cadmium chalcogenide nanoparticles. However, the Group III-V-based semiconductor nanoparticles seem to pass through multiple paths in a non-equilibrium state, and therefore, it may be difficult to find a balance point between the bonding enthalpy and surface energy in the crystal during nanoparticle growth. In other words, it is technically difficult to prepare Group III-V-based InP nanoparticles with a narrow size distribution, which some consider a significant limitation in terms of their commercial applications.

Recently, research results have been reported that nanoclusters with a size of about 1 nanometer (nm) to about 2 nm, which are reactive intermediates in the semiconductor nanoparticle growth pathway, play an important role in the growth mechanism of nanoparticles. In general, the cadmium chalcogenide-based nanoclusters may be rapidly consumed and disappear during the reaction process, whereas in the case of the Group III-V covalent materials such as InP, because the bonding energy between indium and phosphorus and between indium and ligand is quite strong, the thermodynamic stability of the resulting nanoclusters is very high. As a result, the nanoclusters can form through different reaction pathways while consuming monomers necessary for growth in the process of synthesizing nanoparticles, resulting in a mixture of heterogeneous nanoparticles of varied size, shape, and/or crystal structure. Recently, in order to solve this problem, research on synthesizing uniform nanoparticles using the nanocluster itself as a reactive intermediate precursor is attracting attention. For this reason, we set out to separate, synthesize, and identify intermediate nanoclusters for the development of the Group III-V nanoparticles with high homogeneity or for controlling the shape of free nanostructures.

For example, in order to synthesize high-quality nanoparticles, a zinc (Zn) precursor is introduced during the synthesis of InP nanoparticles because the reaction rate may be controlled while the zinc precursor binds to the phosphorus precursor and stabilizes the highly reactive phosphorus precursor. Accordingly, nanoparticles with high uniformity may be synthesized. In addition, for the purpose of increasing the luminous efficiency, the synthesis of the shell layer is facilitated by reducing a difference of the lattice constants during the synthesis of the ZnS shell layer. Therefore, in the process of synthesizing nanoparticles using molecular precursors of indium, zinc, and phosphorus, it may be necessary to separate and synthesize InP nanoclusters including zinc precursors and to investigate the optical, structure, and surface properties of intermediates. Moreover, through the characterization analysis of the prepared nanoclusters, it is possible to gain an in-depth understanding of the nanoparticle growth pathways, and by using the nanoclusters as precursors, a new method of synthesizing high-quality and homogeneous nanoparticles may be achievable.

In this regard, some Group III-V based InP semiconductor nanoclusters are known (See, Dylan C. Gary et al., Chem. Mater. 2015, 27, 14321441; Dylan C. Gary et al., J. Am. Chem. Soc. 2016, 138, 15101513; Jiajia Ning et al., Chem. Commun. 2017, 53, 2626-2629), but very limited types have been reported compared to Group II-VI cadmium-based semiconductor nanoclusters.

We describe the separation and/or synthesis of InP-based nanoclusters including indium and phosphorus that further include zinc, chlorine, or a combination of zinc and chlorine (hereinafter, "InP:Zn nanoclusters," "InP:Cl nanoclusters," or "InP:ZnCl nanoclusters"), and identify the optical and structural characteristics of these nanoclusters. Accordingly, an embodiment provides an InP-based nanoclusters including indium and phosphorus, that further include zinc, chlorine, or a combination of zinc and chlorine as a semiconductor nanocluster, which we refer to as an intermediate in the Group III-V semiconductor nanoparticle growth process.

The InP-based nanoclusters according to the embodiment may further include zinc (Zn) in addition to indium (In) and phosphorus (P).

The InP-based nanoclusters according to the embodiment may be semiconductor nanoclusters including In, P, and Zn, and exhibit a maximum absorption peak at a wavelength of about 393 nm. The semiconductor nanoclusters (hereinafter, referred to as "F393-InP:Zn nanoclusters") have a half-width at half-maximum (HWHM) of the maximum emission peak of less than or equal to about 15 nm, for example, less than or equal to about 13 nm, or for example, less than or equal to about 10 nm, and the particle size measured by electron transmission microscopy (TEM) may be about 2.2 nm±0.4 nm. In any of the embodiments herein, the minimum HWHM of the maximum emission peak may be about 1 nm, or about 2 nm, or about 5 nm.

Here, "half-width at half-maximum (HWHM)' indicates a line width of the emission spectrum, and means a value corresponding to the width to a wavelength that is half the maximum emission intensity in a short wavelength direction from the maximum emission peak wavelength of the emission spectrum of the semiconductor nanocluster. The reason why it is not generally expressed as "full-width at half maximum (FWHM)," which indicates a line width of the emission spectrum, is because trap emission widely distributed in a long wavelength direction may distort the emission line width inherent to semiconductor nanoclusters.

The InP-based nanoclusters according to the embodiment may include In, P, and Zn, and may exhibit a maximum absorption peak at a wavelength of about 408 nm. The InP-based nanoclusters (hereinafter, referred to as "F408-InP:Zn nanoclusters") have a half-width at half-maximum (HWHM) of the maximum emission peak of less than or equal to about 20 nm, for example, less than or equal to about 18 nm, for example, less than or equal to about 15 nm, or for example, less than or equal to about 13 nm, and the particle size measured by TEM may be about 2.2 nm±0.3 nm.

In addition, the InP-based nanoclusters according to the embodiment may include In, P, and Zn, and may exhibit a maximum absorption peak at a wavelength of about 360 nm. The InP-based nanoclusters (hereinafter, referred to as "F360-InP:Zn nanoclusters") have a half-width at half-maximum (HWHM) of the maximum emission peak of less than or equal to about 30 nm, for example, less than or equal to about 28 nm, or for example, less than or equal to about 25 nm, and the particle size measured by TEM may be about 1.7 nm±0.5 nm.

In these InP-based nanoclusters including In, P, and Zn, Zn may be included in a ratio of about 10 mole percent (mol %) to about 40 mol %, for example, about 10 mol % to about 35 mol %, for example, about 12 mol % to about 35 mol %, for example, about 15 mol % to about 35 mol %, for example, about 15 mol % to about 30 mol %, for example, about 15 mol % to about 25 mol %, for example, about 15 mol % to about 20 mol % relative to the moles of In in the InP-based nanoclusters, however the InP-based nanoclusters including In, P, and Zn are not limited to these content ranges.

These InP-based nanoclusters including In, P, and Zn may be synthesized by mixing a first precursor material including indium (In), a second precursor material including phosphorus (P), and a third precursor including zinc (Zn) in an organic solvent and reacting at a high temperature, for example, at a temperature of greater than or equal to about 150° C., for example, greater than or equal to about 160° C., for example, greater than or equal to about 170° C., for example, greater than or equal to about 180° C., for example, greater than or equal to about 190° C., for example, greater than or equal to about 200° C., for example, greater than or equal to about 250° C., for example, greater than or equal to about 280° C., or for example, about 300° C., for a period of time, for example, greater than or equal to about 1 hour, for example, greater than or equal to about 2 hours, for example greater than or equal to about 3 hours, for example greater than or equal to about 5 hours, for example, greater than or equal to about 10 hours, for example, greater than or equal to about 15 hours, for example, greater than or equal to about 18 hours, for example, greater than or equal to about 20 hours, for example, greater than or equal to about 25 hours, for example, greater than or equal to about 27 hours, for example, greater than or equal to about 28 hours, for example, greater than or equal to about 30 hours.

By controlling the reaction temperature, reaction time, and/or the contents of precursors including In, P, or Zn, different semiconductor nanoclusters having different optical properties, such as structure, size, absorption, or emission, of the prepared nanoclusters may be synthesized.

In an embodiment, the F393-InP:Zn nanoclusters may be synthesized by heating and reacting a precursor including In, a precursor including Zn, and a precursor including P in an organic solvent at a temperature of about 300° C. under a nitrogen atmosphere for about 25 hours.

In another embodiment, F408-InP:Zn nanoclusters may be synthesized by heating and reacting a precursor including In, a precursor including Zn, and a precursor including P in an organic solvent at a temperature of about 300° C. under a nitrogen atmosphere for about 3 hours.

In another embodiment, the F360-InP:Zn nanoclusters may be synthesized by heating and reacting a precursor including In, a precursor including Zn, and a precursor including P in an organic solvent under a nitrogen atmosphere at a temperature of about 180° C. for about 28 hours.

As described above, the F393-InP:Zn nanoclusters, F408-InP:Zn nanoclusters, and F360-InP:Zn nanoclusters prepared under different reaction conditions may have a different maximum absorption peak wavelength, a different half-width at half-maximum of a maximum emission peak, a different crystal structure, and/or a different size of the nanocluster.

In an embodiment, the first precursor including indium may be indium acetate, indium myristate, indium acetylacetonate, indium carboxylate, indium halide (indium fluoride, indium chloride, indium bromide, indium iodide, etc.), indium nitrate, indium hydroxide, indium oxide, indium sulfate, indium alkyl phosphonates (such as indium octadecyl phosphonate), or a combination thereof, but is not limited thereto.

In an embodiment, the second precursor including phosphorus may be tris(trimethylsilyl)phosphine ((TMS)$_3$P), triethylphosphine, tributylphosphine, trioctylphosphine, triphenylphosphine, tricyclohexylphosphine, tris(diethylamino)phosphine, tris(dimethylamino)phosphine, tris(dimethylamino)phosphine), or a combination thereof, but is not limited thereto.

In an embodiment, the third precursor including zinc includes a Zn metal powder, an alkylated Zn compound (dimethyl zinc, diethyl zinc, etc.), Zn alkoxide, Zn carboxylate (zinc acetate, zinc stearate, etc.), Zn carbonate, Zn nitrate, Zn perchlorate, Zn sulfate, Zn acetylacetonate, Zn halide (zinc iodide, zinc bromide, zinc chloride, zinc fluoride, etc.), Zn cyanide, Zn hydroxide, Zn oxide, Zn peroxide, or a combination thereof.

In an embodiment, the first precursor including indium and the third precursor including zinc may be each dispersed in an organic solvent and pretreated before mixing. The pretreatment may include heating a solution including the precursors at a certain temperature or higher, for example, greater than or equal to about 100° C., for example, greater than or equal to about 200° C., for example, greater than or equal to about 250° C., for example, at a temperature of about 300° C. For the first precursor including indium, an organic group bonded to indium may be exchanged with another organic group by a ligand compound included in the organic solvent. For example, when indium acetate is selected as the first precursor including indium, by pretreatment with octadecylphosphonic acid in a solvent during the pretreatment process, the first precursor is likely converted from indium acetate to indium octadecyl phosphate to react with a second precursor material and a third precursor material.

The pretreated first precursor and the third precursor are each cooled to room temperature, and then mixed under a nitrogen atmosphere. After which the second precursor including phosphorus may be added to the mixture of the first precursor and the third precursor at room temperature. In this case, the second precursor including phosphorus may also be pre-dispersed in the organic solvent before the mixing.

After the first precursor, the second precursor, and the third precursor are uniformly mixed, the mixture is heated and reacted to the aforementioned temperature range. Accordingly, semiconductor nanoclusters including indium, phosphorus, and zinc according to an embodiment may be prepared.

As the organic solvent that may be used in the above reaction, any organic solvent that is usable in the preparation of semiconductor nanoparticles may be used, and is not limited to a particular type. For example, the organic solvent may include C6 to C22 primary amines such as hexadecylamine, C6 to C22 secondary amines such as dioctylamine, C6 to C40 tertiary amines such as trioctylamine, nitrogen-containing heterocyclic compounds such as pyridine, etc., C6 to C40 olefins such as octadecene, C6 to C40 aliphatic hydrocarbons such as hexadecane, octadecane, and squalane, aromatic hydrocarbon substituted with a C6 to C30 alkyl group such as phenyldodecane, phenyltetradecane, phenylhexadecane, etc., primary, secondary, or tertiary phosphine substituted with at least one (e.g., 1, 2, or 3) C6 to C22 alkyl group (e.g., trioctylamine), phosphine oxide (e.g., trioctylphosphine oxide) substituted with at least one (e.g., 1, 2, or 3) C6 to C22 alkyl group, C12 to C22 aromatic ether such as phenyl ether, benzyl ether, etc., or a combination thereof.

The ligand compound included in the organic solvent in the process of pretreating the first precursor including indium may be any material that binds to indium to form the first precursor, for example, methane thiol, ethane thiol, propane thiol, butane thiol, pentane thiol, hexane thiol, octane thiol, dodecane thiol, hexadecane thiol, octadecane thiol, benzyl thiol; methanamine, ethane amine, propane amine, butane amine, pentane amine, hexane amine, octane amine, dodecane amine, hexadecyl amine, oleyl amine, octadecyl amine, dimethyl amine, diethyl amine, dipropyl amine; methanoic acid, ethanoic acid, propanoic acid, butanoic acid, pentanoic acid, hexanoic acid, heptanoic acid, octanoic acid, dodecanoic acid, hexadecanoic acid, octadecanoic acid, oleic acid, benzoic acid, palmitic acid, myristic acid, stearic acid; phosphines such as methyl phosphine, ethyl phosphine, propyl phosphine, butyl phosphine, pentyl phosphine, tributyl phosphine, and trioctylphosphine; phosphine compounds or oxide compounds thereof such as methyl phosphine oxide, ethyl phosphine oxide, propyl phosphine oxide, butyl phosphine oxide, and trioctylphosphine oxide; diphenyl phosphine, triphenyl phosphine compound or oxide compound thereof; phosphonic acid or alkyl phosphonic acid (such as octadecylphosphonic acid), but is not limited thereto. The organic ligand compound may be used alone or as a mixture of two or more.

In another embodiment, the InP-based nanoclusters including indium, phosphorus, and zinc may be prepared through a chemical conversion method of heating at a specific temperature for a certain time or longer, and thus, converting an InP-based nanoclusters including specific indium, phosphorus, and zinc that have already been prepared through the aforementioned precursor methods or that have been separated during the synthesis of nanoparticles into InP-based nanoclusters including In, P, and Zn having different crystal structures, particle sizes, and/or luminescence properties.

For example, the F393-InP:Zn nanoclusters according to an embodiment may be obtained by heating the F408-InP:Zn nanoclusters according to another embodiment at a temperature of about 300° C. for about 24 hours. In addition, the F408-InP:Zn nanoclusters according to an embodiment may be obtained by heating the F360-InP:Zn nanoclusters according to another embodiment at a temperature of about 300° C. for about 2 hours.

Synthesis of semiconductor nanoclusters having specific sizes, specific optical properties, and/or specific structures through such a chemical conversion method may be confirmed by separating the semiconductor nanoclusters synthesized according at various reaction heating times in the aforementioned heating process, and then by measuring, for example, absorption and/or luminescence properties, crystal structures, the optical properties thereof and/or particle sizes, and the like.

Accordingly, according to an embodiment, InP-based semiconductor nanoclusters including indium, phosphorus, and zinc may be easily synthesized by either a molecular precursor synthesis method from precursors forming the semiconductor nanoclusters, such as a first precursor compound, a second precursor compound, and a third precursor compound, or a method of chemically converting already prepared semiconductor nanoclusters through a process such as heating.

The InP-based nanoclusters according to an embodiment may further include chlorine (Cl) in addition to indium (In) and phosphorus (P).

The InP-based nanoclusters according to the embodiment may be semiconductor nanoclusters including In, P, and Cl, and exhibiting a maximum absorption peak at a wavelength of about 399 nm. The semiconductor nanoclusters (hereinafter, referred to as "F399-InP:Cl nanoclusters") have a half-width at half maximum (HWHM) of the maximum emission peak of less than or equal to about 10 nm, for example, less than or equal to about 9 nm, for example, less than or equal to about 8 nm, and the particle size measured by an electron transmission microscope (TEM) may be about 2.1 nm±0.3 nm.

The InP-based nanoclusters according to the embodiment may include In, P, and Cl, and may exhibit a maximum absorption peak at a wavelength of about 360 nm. The InP-based nanoclusters (hereinafter referred to as "F360-InP:Cl nanoclusters") have a half-width at half-maximum (HWHM) of the maximum emission peak of less than or equal to about 20 nm, for example, less than or equal to about 25 nm, for example, less than or equal to about 22 nm, for example, less than or equal to about 20 nm, and the particle size measured by TEM may be about 1.7 nm±0.3 nm.

In these InP-based nanoclusters including In, P, and Cl, Cl may be included in less than or equal to about 90 mol %, for example, less than or equal to about 88 mol %, for example, less than or equal to about 85 mol %, for example, less than or equal to about 80 mol %, for example, less than or equal to about 75 mol %, for example, less than or equal to about 70 mol %, for example, less than or equal to about 67 mol %, or for example, less than or equal to about 65 mol %, relative to mole of indium, but is not limited to these content ranges.

The InP-based nanoclusters including In, P, and Cl may be synthesized by mixing a first precursor material including indium (In), a second precursor material including phosphorus (P), and a third precursor including chlorine (Cl) in an organic solvent and by reacting the mixture at a temperature of greater than or equal to about 70° C., for example, greater than or equal to about 75° C., for example, greater than or equal to about 80° C., for example, greater than or equal to about 85° C., for example, greater than or equal to about 90° C., for example, greater than or equal to about 95° C., for example, greater than or equal to about 100° C., for example, greater than or equal to about 105° C., or for example, about 110° C., for a certain period of time, for example, greater than or equal to about 0.5 hours, for example, greater than or equal to about 1 hour, for example, greater than or equal to about 1.5 hours, for example greater than or equal to about 2 hours, for example greater than or equal to about 2.5 hours, for example greater than or equal to about 3 hours, for example greater than or equal to about 3.5 hours, for example greater than or equal to about 4 hours, for example greater than or equal to about 4.5 hours, for example greater than or equal to about 5 hours, for example greater than or equal to about 5.5 hours, or for example greater than or equal to about 6 hours.

By controlling the reaction temperature, reaction time, and/or the content of a precursor including In, P, or Cl, different semiconductor nanoclusters having different optical properties such as structures, sizes, absorption, or emission of the prepared nanoclusters may be synthesized.

In an embodiment, the F399-InP:Cl nanoclusters may be synthesized by heating and reacting a precursor including In, a precursor including Cl, and a precursor including P in an organic solvent at a temperature of about 110° C. under a nitrogen atmosphere for about 1 hour.

In another embodiment, the F360-InP:Cl nanoclusters may be synthesized by heating and reacting a precursor including In, a precursor including Cl, and a precursor including P in an organic solvent under a nitrogen atmosphere at a temperature of about 80° C. for about 6 hours.

As described above, the F399-InP:Cl nanoclusters and the F360-InP:Cl nanoclusters prepared under these different reaction conditions have a different maximum absorption peak wavelength, a different half-width of the maximum emission peak, and a different crystal structure and/or a different size of the nanoclusters by X-ray diffraction (XRD) analysis.

According to an embodiment, the first precursors including indium may be selected from the same aforementioned first precursor compounds including indium that is used in the synthesis of InP-based nanoclusters including indium, phosphorus, and zinc, but the present disclosure is not limited thereto.

According to an embodiment, the second precursors including phosphorus may be selected from the same aforementioned second precursor compounds including phosphorus that is used in the synthesis of InP-based nanoclusters including indium, phosphorus, and zinc, but the present disclosure is not limited thereto.

In an embodiment, as the third precursor including chlorine, a chloride of a metal, for example, a chloride of zinc, a chloride of gallium, a chloride of sodium, a chloride of potassium, a chloride of indium, a chloride of silicon, etc. may be used and. For example, zinc chloride ($ZnCl_2$), gallium chloride ($GaCl_3$), sodium chloride (NaCl), potassium chloride (KCl), indium chloride (InCl, $InCl_2$, $InCl_3$, etc.), diphenylindium chloride (($C_6H_5$)$_2$InCl), trimethylsilylchloride, and the like may be used, but the present disclosure is not limited thereto.

In an embodiment, the first precursor including indium and the third precursor including chlorine may each be dispersed in an organic solvent and pretreated before mixing. The pretreatment may include heating the solution including the precursors at a temperature of a certain temperature or higher, for example, greater than or equal to about 100° C., for example, greater than or equal to about 105° C., or for example, about 110° C. In the first precursor including indium, an organic group bonded to indium may be exchanged with another organic group by a ligand compound included in the organic solvent. For example, when indium acetate is selected as the first precursor including indium, the indium acetate of the first precursor may be converted to indium myristate by pretreatment with myristic acid in the solvent during the pretreatment process to react with the second precursor material and the third precursor material.

The pretreated first precursor and the third precursor are cooled to a specific temperature, e.g., room temperature, respectively, and then mixed under a nitrogen atmosphere. The phosphorus second precursor is then added to the mixture of the first precursor and the third precursor to provide a reaction mixture. In this case, the second precursor including the phosphorus may also be pre-dispersed in the organic solvent before the mixing.

After the first precursor, the second precursor, and the third precursor are uniformly mixed, the reaction mixture is heated to the aforementioned temperature range, to obtain semiconductor nanoclusters including indium, phosphorus, and chlorine according to an embodiment.

Examples of the organic solvent that is usable in the reaction, and the ligand compound included in the organic solvent during the pretreatment of the first precursor may be the aforementioned organic solvent and ligand compound used for synthesizing InP-based nanoclusters including indium, phosphorus, and zinc.

In another embodiment, the InP-based nanoclusters including indium, phosphorus, and chlorine may be prepared by a chemical conversion method of using precursors of magic-sized InP nanoclusters that have already been prepared, e.g., by reacting the respective precursors with a precursor including chlorine.

For example, the F399-InP:Cl nanoclusters according to an embodiment may be prepared by reacting InP nanoclusters (hereinafter, referred to as 386-InP nanoclusters) made of indium and phosphorus that exhibit a maximum absorption peak at a wavelength of 386 nm with a precursor including chlorine, for example, indium chloride at a temperature of about 110° C. for about 3 hours. In addition, during the reaction of the 386-InP nanoclusters with the indium chloride, the aforementioned F399-InP:Cl nanoclusters may also be prepared by mixing at room temperature, and then by raising the temperature of the reaction mixture from room temperature to about 150° C. In this case, as an intermediate step, F360-InP:Cl nanoclusters according to an embodiment showing a maximum absorption peak at 360 nm at about 110° C. may be prepared. Moreover, with further heating to 150° C., the F360-InP:Cl nanoclusters may be converted into F399-InP:Cl nanoclusters. Meanwhile, the F360-InP:Cl nanoclusters may be prepared by mixing the aforementioned 386-InP nanoclusters with indium chloride at room temperature, then raising the reaction temperature to about 80° C. and reacting for about 18 hours.

Accordingly, according to an embodiment, InP-based semiconductor nanoclusters including indium, phosphorus, and chlorine may be easily prepared by either a molecular precursor synthesis method in which it is synthesized from precursors forming the semiconductor nanoclusters, such as a first precursor compound, a second precursor compound, and a third precursor compound or a method of chemically converting already prepared semiconductor nanoclusters through a process such as heating.

In another embodiment, InP-based nanoclusters including indium and phosphorus, and further including zinc and chlorine are prepared. These InP-based nanoclusters may be synthesized through a precursor synthesis method in which a first precursor including indium, a second precursor including phosphorus, a third precursor including zinc, and a fourth precursor including chlorine are mixed in an organic solvent and then heated.

Alternatively, InP-based nanoclusters including indium and phosphorus, and further including zinc and chlorine are prepared through a chemical conversion method in which already prepared InP-based semiconductor nanoclusters are additionally heated. Each of the first precursor including indium, the second precursor including phosphorus, the third precursor including zinc, and the fourth precursor including chlorine may be the same precursors that are used for preparation of the aforementioned InP-based nanoclusters including indium and phosphorus, and zinc or chlorine. Since the same materials may be used for both the organic solvent and the ligand material used in the reaction, detailed descriptions thereof are omitted.

The InP-based nanoclusters prepared as described above, including indium and phosphorus, and optionally zinc and/or chlorine, may be used as a precursor for preparation of InP-based semiconductor nanoparticles indium and phosphorus, and optionally further including zinc and/or chlorine. The preparation of InP-based semiconductor nanoparticles using these InP-based nanoclusters as a precursor may include heating these InP-based nanoclusters included in an organic solvent, so that these InP-based nanoclusters can form InP-based semiconductor nanoparticles. Alternatively, during the heating, a precursor including indium, a precursor including phosphorus, and optionally a precursor including zinc and/or a precursor including chlorine may be heated while further adding to the organic solvent including the InP-based nanoclusters while heating to form InP-based semiconductor nanoparticles. In both cases, by using semiconductor nanoclusters having a certain size and shape as a precursor, it is possible to prepare InP-based semiconductor nanoparticles having a more homogeneous size and/or a controlled nanostructure morphology.

Accordingly, another embodiment provides a method for preparing InP-based nanoparticles, including heating and reacting the InP-based nanoclusters. The preparing method includes heating while further adding a precursor including indium, a precursor including phosphorus, and optionally a precursor including zinc and/or a precursor including chlorine to the organic solvent including the InP-based nanoclusters.

Hereinafter, a method of preparing InP-based nanoclusters according to an embodiment and characterization of the prepared InP-based nanoclusters will be described in detail through examples. However, these examples are only examples for describing the embodiments of the present disclosure, and these examples should not be construed as limiting the scope of the present disclosure.

EXAMPLES

Example 1: Synthesis and Characterization of F393-InP:Zn Nanoclusters

The F393-InP:Zn nanoclusters are prepared by using indium acetate $(In(Ac)_3)$ as an indium precursor, tris(trimethylsilyl)phosphine $(TMS_3P)$ as a phosphorus precursor, and zinc stearate $(Zn(St)_2)$ as a zinc precursor. The indium precursor is reacted with octadecylphosphonic acid (ODPA) to prepare indium octadecyl phosphonate $(In(ODPA)_{1.5})$, which is then reacted with the zinc precursor and the phosphorus precursor. The specific reaction process is as follows.

(1) Synthesis of indium octadecyl phosphonate: After dispersing 0.6 millimoles (mmol) of indium acetate and 1.11 mmol of octadecylphosphonic acid in 12 milliliters (mL) of 1-octadecene (ODE) solvent, the reaction solution is heated with stirring under vacuum at 100° C. for 1 hour, and the mixture is then heated with stirring for 2 hours at a temperature of 300° C. under a nitrogen atmosphere. After the lowering the temperature to 100° C., the reaction solution is heated with stirring under vacuum for 1 hour. The temperature is then lowered to room temperature under a nitrogen atmosphere.

(2) Preparation of zinc stearate: After dispersing 0.6 mmol of zinc stearate in 10 mL of 1-octadecene solvent, the reaction solution is heated with stirring at 110° C. under vacuum for 1 hour, after which the temperature is maintained under a nitrogen atmosphere.

(3) Mixing and reaction of indium precursor, zinc precursor, and phosphorus precursor: The zinc stearate solution of step (2) above and the indium octadecyl phosphonate solution prepared in step (1) above are mixed in a reaction flask under a nitrogen atmosphere with stirring. After 10 minutes, a phosphorus precursor solution prepared by dispersing 0.3 mmol of tris(trimethylsilyl)phosphine in 2 mL of 1-octadecene solvent is added to the reaction mixture at room temperature. The mixture is heated to a temperature of 300° C. for about 25 hours to prepare semiconductor nanoclusters including indium, phosphorus, and zinc.

The absorption and emission spectra of the prepared nanoclusters are shown in FIG. 1. As shown in FIG. 1, the F393-InP:Zn nanoclusters exhibit optical characteristics with a maximum absorption peak wavelength of about 393 nm and a half-width at half maximum (HWHM) of the maximum emission peak of about 10 nm.

Figure 2:
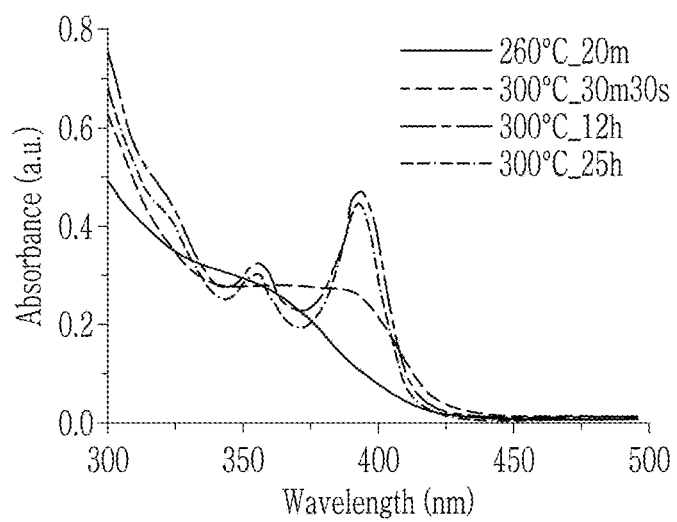
FIG. 2 is a plot of absorption spectra showing the growth changes of the F393-InP:Zn nanoclusters prepared by the molecular precursor synthesis method of Example 1 over time.

FIG. 2 shows the changes in the absorption spectra of formed particles as the reaction mixture is heated at 300° C. over the 25 hours. As shown, the InP:Zn nanoclusters become more defined with time and could be said to have a thermodynamically and optically stable shape.

Figure 3:
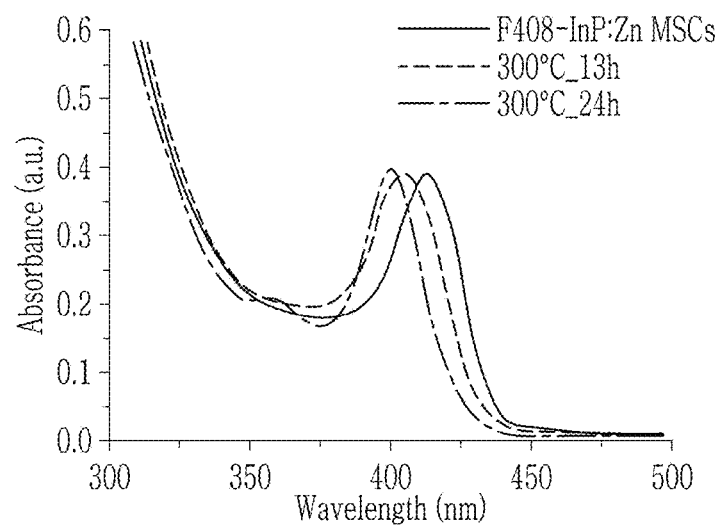
FIG. 3 is a plot of absorption spectra for preparing F393-InP:Zn nanoclusters prepared by the molecular precursor synthesis method of Example 1 by heating the F408-InP:Zn nanoclusters prepared in Example 2 over time.

FIG. 3 shows absorption spectra during the growth process of F393-InP:Zn nanoclusters synthesized by chemical conversion by further heating the F408-InP:Zn nanoclusters prepared in Example 2 (see, below) at 300° C. As indicated by FIG. 3, similar F393-InP:Zn nanoclusters as those prepared using the molecular precursor method of Example 1 may be prepared by further heating InP-based nanoclusters having different maximum absorption peak wavelengths.

The results of analyzing the composition of the F393-InP:Zn nanoclusters prepared using the molecular precursor method of Example 1 through ICP-AES is shown in Table 1.

TABLE 1

| MSC | element | | |
|---|---|---|---|
| | In | P | Zn |
| F393-InP:Zn | 1.0 | 1.3 | 0.23 |

Figure 4:
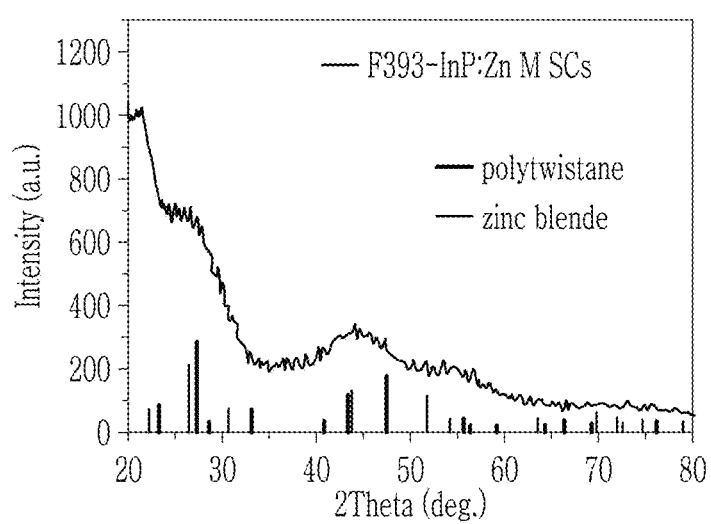
FIG. 4 is an X-ray diffraction graph of the F393-InP:Zn nanoclusters prepared in Example 1.

FIG. 4 is an XRD graph of the prepared F393-InP:Zn nanoclusters. As shown in FIG. 4, the F393-InP:Zn nanoclusters prepared by the molecular precursor method of Example 1 have a zinc blende type structure.

Figure 5:
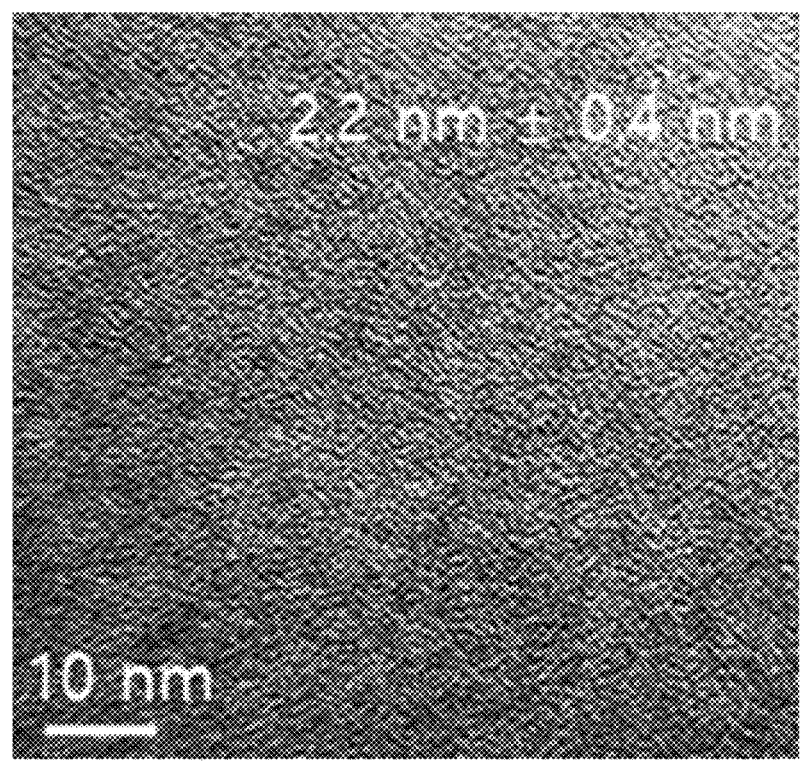
FIG. 5 is a transmission electron microscope (TEM) photograph of the F393-InP:Zn nanoclusters prepared in Example 1.

In addition, FIG. 5 is a TEM photograph of the prepared F393-InP:Zn nanoclusters, which shows that the particle size of the nanoclusters is in the range of about 2.2 nm±0.4 nm.

Example 2: Synthesis and Characterization of F408-InP:Zn Nanoclusters

The F408-InP:Zn nanoclusters are also prepared in the manner of Example 1. Indium octadecyl phosphonate (In (ODPA)$_{1.5}$) as an indium precursor prepared by reacting indium acetate (In(Ac)$_3$) with octadecylphosphonic acid (ODPA) is mixed with tris(trimethylsilyl)phosphine (TMS$_3$P) as a phosphorus precursor, and zinc stearate (Zn (St)$_2$) as a zinc precursor to provide a reaction mixture. The specific reaction conditions are as follows.

(1) Synthesis of indium octadecyl phosphonate: Indium acetate, 0.6 mmol, and 0.9 mmol of octadecylphosphonic acid precursor are dispersed in 12 mL of 1-octadecene (ODE) solvent, the reaction solution is heated with stirring under vacuum at 100° C. for 1 hour. The reaction mixture is then heated with stirring for 2 hours at a temperature of 300° C. under a nitrogen atmosphere. Thereafter, after lowering the temperature to 100° C., the reaction solution is heated with stirring under vacuum for 1 hour. The temperature is then lowered to room temperature under a nitrogen atmosphere.

(2) Preparation of zinc stearate: After dispersing 0.6 mmol of zinc stearate precursor in 10 mL of 1-octadecene solvent, the reaction solution is heated with stirring at 110° C. under vacuum for 1 hour, and the temperature is then maintained under a nitrogen atmosphere.

(3) Mixing and reaction of indium precursor, zinc precursor, and phosphorus precursor: After mixing the zinc stearate solution of step (2) above with the indium octadecyl phosphonate solution prepared in step (1) above, under a nitrogen atmosphere for 10 minutes, a phosphorus precursor solution prepared by dispersing 0.3 mmol of tris(trimethylsilyl)phosphine in 2 mL of 1-octadecene solvent is added at room temperature. The reaction mixture is then heated at a temperature of 300° C. for about 3 hours to prepare semiconductor nanoclusters including indium, phosphorus, and zinc.

Figure 6:
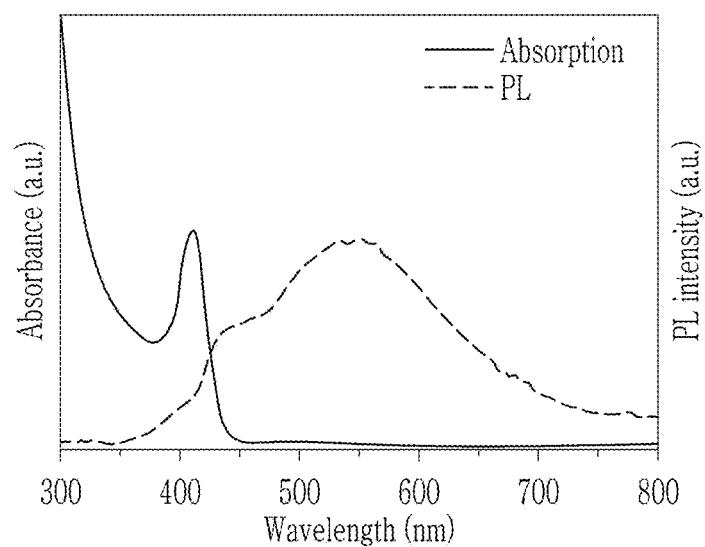
FIG. 6 is an absorption and emission spectrum of the F408-InP:Zn nanoclusters prepared in Example 2.

The absorption and emission spectra of the prepared nanoclusters are shown in FIG. 6. As shown in FIG. 6, the F408-InP:Zn nanoclusters exhibit optical characteristics with a maximum absorption peak wavelength of about 408 nm and a half-width at half maximum (HWHM) of the emission peak of about 13 nm.

Figure 7:
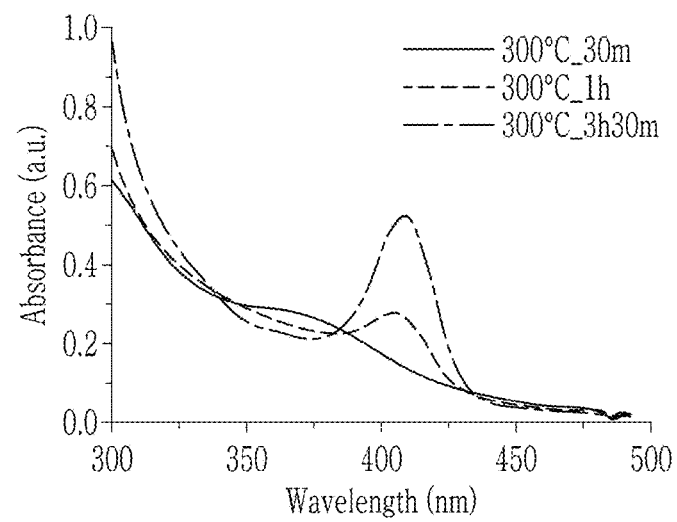
FIG. 7 is a plot of absorption spectra showing the growth changes of F408-InP:Zn nanoclusters prepared by the molecular precursor synthesis method according to Example 2 over time.

FIG. 7 shows how the absorption spectra of formed particles changes over time as the reaction mixture including the indium precursor, the zinc precursor, and the phosphorus precursor is heated at 300° C. As indicated by FIG. 7, the InP:Zn nanoclusters become more defined with time and could be said to have a thermodynamically and optically stable shape.

Figure 8:
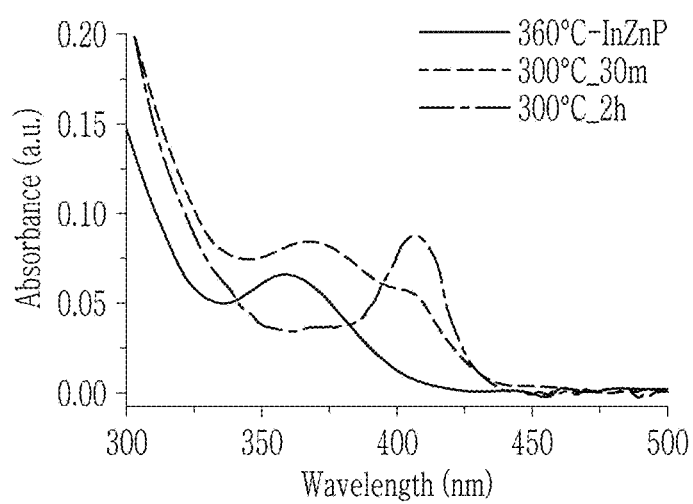
FIG. 8 is a plot of absorption spectra for preparing F408-InP:Zn nanoclusters prepared in Example 2 by heating the F360-InP:Zn nanoclusters prepared in Example 3 over time.

FIG. 8 is an absorption spectrum showing a growth process of the F408-InP:Zn nanoclusters synthesized through chemical conversion method by further heating the F360-InP:Zn nanoclusters of Example 3 at 300° C. Referring to FIG. 8, the same nanoclusters as the F408-InP:Zn nanoclusters prepared in the molecular precursor method of Example 2 may be prepared having a different maximum absorption peak wavelength with an additional heat treatment of the InP-based nanoclusters.

The results of analyzing the composition of the F393-InP:Zn nanoclusters prepared using the molecular precursor method of Example 2 through ICP-AES are shown in Table 2.

TABLE 2

| MSC | element | | |
|---|---|---|---|
| | In | P | Zn |
| F408-InP:Zn | 1.0 | 1.2 | 0.28 |

Figure 9:
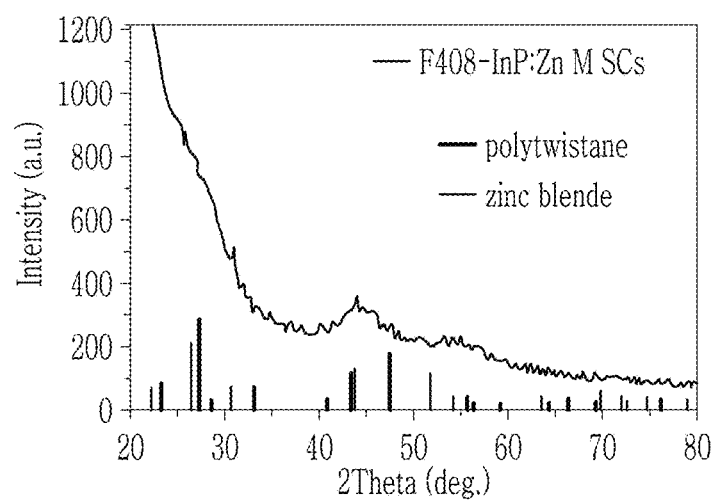
FIG. 9 is an X-ray diffraction (XRD) graph of the F408-InP:Zn nanoclusters prepared in Example 2.
Figure 10:
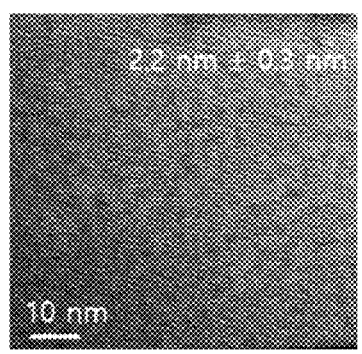
FIG. 10 is a transmission electron microscope (TEM) photograph of the F408-InP:Zn nanoclusters prepared in Example 2.

FIG. 9 is an XRD graph of the prepared F408-InP:Zn nanoclusters. As shown in FIG. 9, the F408-InP:Zn nanoclusters according to Example 2 exhibit a zinc blende type structure. FIG. 10 is a TEM photograph of the prepared F408-InP:Zn nanoclusters, which shows that these nanoclusters have a particle size ranging from about 2.2 nm±0.3 nm.

Example 3: Synthesis and Characterization of F360-InP:Zn Nanoclusters

F360-InP:Zn nanoclusters are prepared in the same manner as in Example 1. Indium octadecyl phosphonate (In(ODPA)$_{1.5}$) as an indium precursor prepared by reacting indium acetate (In(Ac)$_3$) with octadecylphosphonic acid (ODPA) is mixed with tris(trimethylsilyl)phosphine (TMS$_3$P) as a phosphorus precursor, and zinc stearate (Zn(St)$_2$) as a zinc precursor to provide a reaction mixture. The specific reaction conditions are as follows.

(1) Synthesis of indium octadecyl phosphonate: Indium acetate, 0.6 mmol, and 1.2 mmol of octadecylphosphonic acid precursor are dispersed in 12 mL of 1-octadecene (ODE) solvent, and the reaction solution is heated with stirring under vacuum at 100° C. for 1 hour. The reaction mixture is then heated with stirring for 2 hours at a temperature of 300° C. under a nitrogen atmosphere. After lowering the temperature of the reaction mixture to 100° C., the reaction mixture is heated with stirring under vacuum for 1 hour. The temperature is then lowered to room temperature under a nitrogen atmosphere.

(2) Preparation of zinc stearate: After dispersing 0.6 mmol of zinc stearate precursor in 10 mL of 1-octadecene solvent, the reaction solution is heated with stirring at 110° C. under vacuum for 1 hour. The temperature is then maintained under a nitrogen atmosphere.

(3) Mixing and reaction of indium precursor, zinc precursor, and phosphorus precursor: After mixing the zinc stearate solution of step (2) above with the indium octadecyl phosphonate solution prepared in step (1) above, under a nitrogen atmosphere for 10 minutes, a phosphorus precursor solution prepared by dispersing 0.3 mmol of tris(trimethylsilyl)phosphine in 2 mL of 1-octadecene solvent is added at room temperature. The reaction mixture is heated at a temperature of 180° C. for about 28 hours to prepare semiconductor nanoclusters including indium, phosphorus, and zinc.

Figure 11:
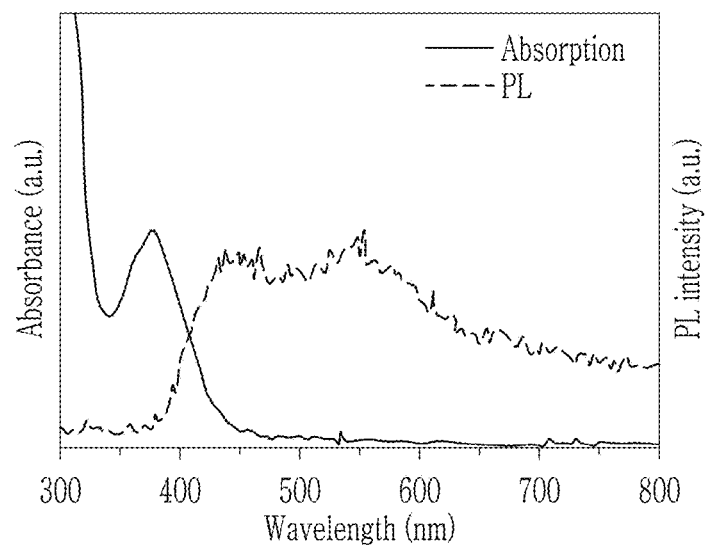
FIG. 11 is an absorption and emission spectrum of the F360-InP:Zn nanoclusters prepared in Example 3.

The absorption and emission spectra of the prepared nanoclusters are shown in FIG. 11. As shown, the F408-InP:Zn nanoclusters exhibit optical characteristics with a maximum absorption peak wavelength of about 360 nm and a half-width at half maximum (HWHM) of the emission peak of about 25 nm.

Figure 12:
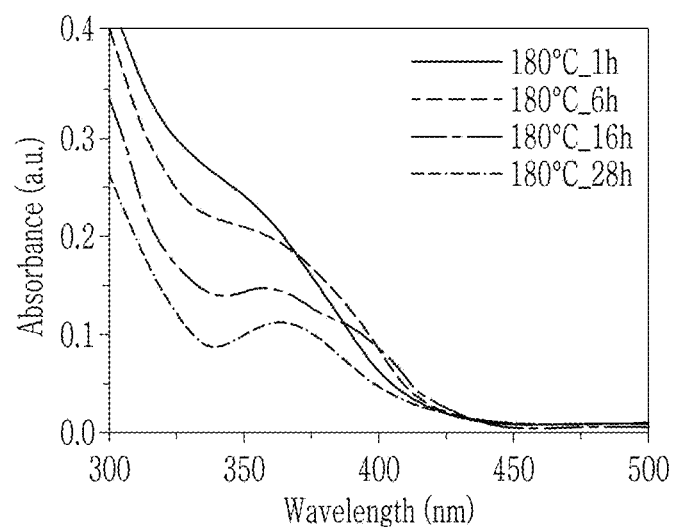
FIG. 12 is a plot of absorption spectra showing changes in the growth of the F360-InP:Zn nanoclusters prepared by the molecular precursor synthesis method in Example 3.

FIG. 12 shows the changes in the absorption spectra of formed particles over time at a reaction temperature of 180° C. after mixing the indium precursor, the zinc precursor, and the phosphorus precursor. As indicated in FIG. 12, the InP:Zn nanoclusters become more defined with time and could be said to have a thermodynamically and optically stable shape.

The results of analyzing the composition of the F360-InP:Zn nanoclusters prepared using the molecular precursor method of Example 3 through ICP-AES are shown in Table 3.

TABLE 3

| MSC | element | | |
|---|---|---|---|
| | In | P | Zn |
| F360-InP:Zn | 1.0 | 1.3 | 0.16 |

Figure 13:
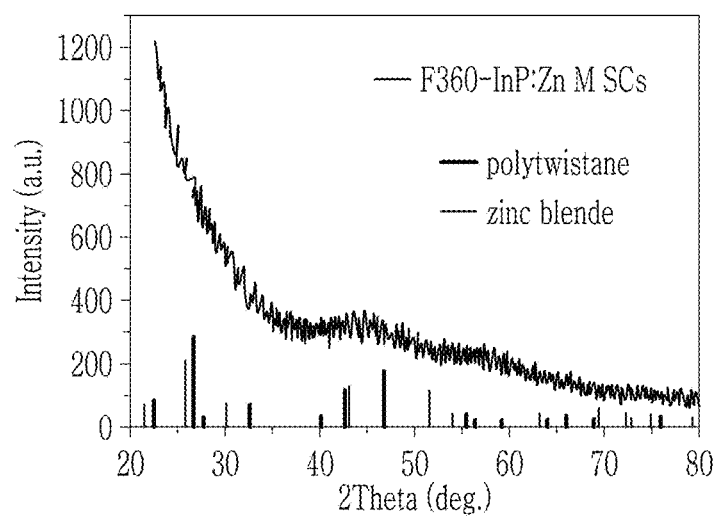
FIG. 13 is an X-ray diffraction (XRD) graph of the F360-InP:Zn nanoclusters prepared in Example 3.
Figure 14:
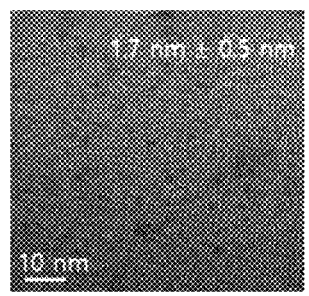
FIG. 14 is a transmission electron microscope (TEM) photograph of the F360-InP:Zn nanoclusters prepared in Example 3.

FIG. 13 is an XRD graph of the prepared F360-InP:Zn nanoclusters. As shown, the F360-InP:Zn nanoclusters according to Example 3 exhibit a polytwistane type structure. FIG. 14 is a TEM photograph of the prepared F360-InP:Zn nanoclusters, showing that the particle size of the nanoclusters is in the range of about 1.7 nm±0.5 nm.

Example 4: Synthesis and Characterization of F399-InP:Cl Nanoclusters (1) Synthesis of F399-InP:Cl Nanoclusters Using Molecular Precursors F399-InP:Cl nanoclusters are prepared using indium acetate (In(Ac)$_3$) as an indium precursor, tris(trimethylsilyl)phosphine (TMS$_3$P) as a phosphorus precursor, and indium chloride (InCl$_3$) as a chlorine precursor. The indium precursor is reacted with myristic acid (MA) to prepare indium myristate In(MA)$_3$, which is then reacted with the chlorine precursor and the phosphorus precursor. The specific reaction process is as follows.

(i) Synthesis of indium myristate: Indium acetate, 0.8 mmol, and 2.4 mmol of myristic acid are dispersed in 10 mL of 1-octadecene (ODE) solvent, and the reaction solution is heated with stirring at 110° C. under vacuum for 2 hours.

(ii) Preparation of indium chloride: 0.5 mmol of indium chloride is dispersed in 10 mL of 1-octadecene solvent, and heated with stirring at 110° C. under vacuum for 1 hour.

(iii) Mixing and reaction of indium precursor, chlorine precursor, and phosphorus precursor: The indium myristate solution prepared in step (i) is mixed with the indium chloride solution prepared in step (ii) under a nitrogen atmosphere. A phosphorus precursor solution is prepared by dispersing 0.4 mmol tris(trimethylsilyl)phosphine in 0.5 mL of an 1-octadecene solvent, which is then added to the mixed indium solution. The reaction mixture is heated at 110° C. for 1 hours to prepare semiconductor nanoclusters including indium, phosphorus, and chlorine.

Figure 15:
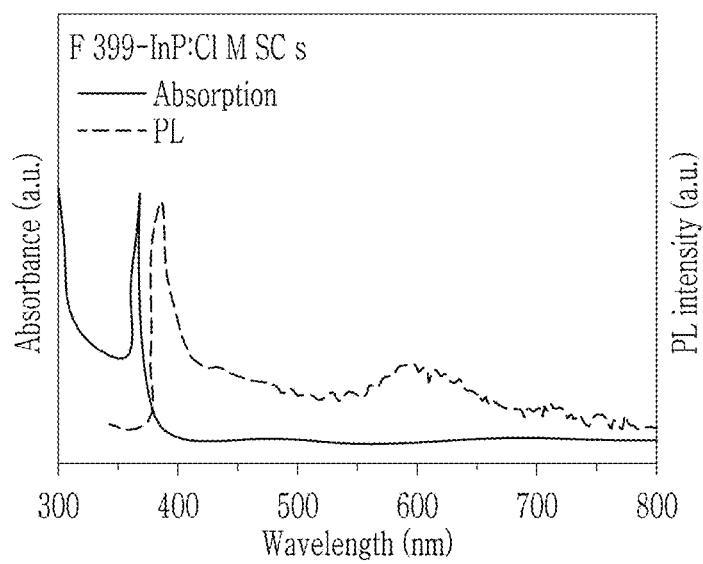
FIG. 15 is an absorption and emission spectrum of F399-InP:Cl nanoclusters prepared by the molecular precursor synthesis method according to (1) of Example 4.

The absorption and emission spectra of the nanoclusters are shown in FIG. 15. As shown, the F393-InP:Zn nanoclusters exhibit optical characteristics with a maximum absorption peak wavelength of about 399 nm and a half-width at half maximum (HWHM) of the emission peak of about 8 nm.

Figure 16:
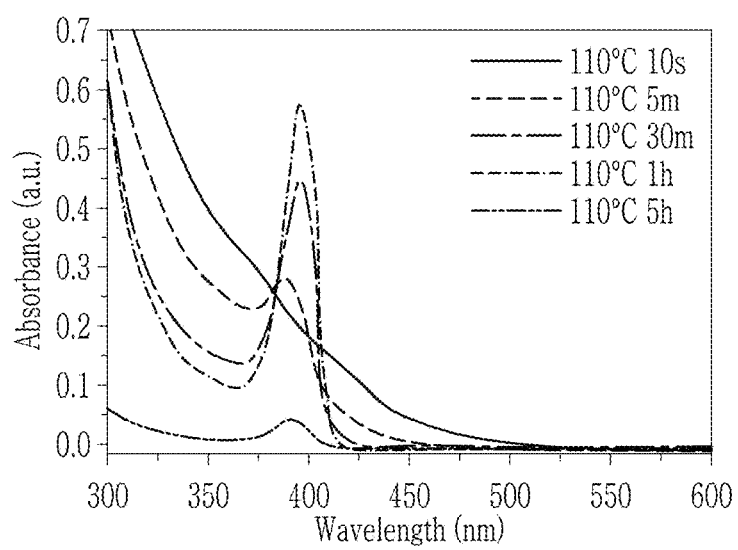
FIG. 16 is a plot of absorption spectra showing changes in the growth of F399-InP:Cl nanoclusters prepared by the molecular precursor synthesis method according to (1) of Example 4 over time.

FIG. 16 shows the changes in the absorption spectrum of formed particles as the reaction mixture is heated at 110° C. over the 5 hours. As indicated by FIG. 16, the InP:Cl nanoclusters become more defined with time and could be said to have a thermodynamically and optically stable shape.
(2) Synthesis of F399-InP:Cl Nanoclusters Through Chemical Conversion The same InP-based semiconductor nanoclusters as the F399-InP:Cl nanoclusters prepared by the molecular precursors of the (1) above are prepared through a chemical conversion method of using what we refer to as "magic-sized" InP nanoclusters with an absorption peak at a wavelength of 386 nm (hereinafter, referred to as '386-InP MSCs'). The '386-InP MSCs' precursor is then reacted with a chlorine precursor. The specific reaction process is as follows.

(i) 386-InP MSCs synthesis: Indium acetate, 0.8 mmol, and 2.9 mmol of myristic acid are dispersed in 20 mL of a 1-octadecene solvent at a temperature of 110° C. Tris (trimethylsilyl)phosphine precursor, 0.4 mmol, is added to the indium solution under a nitrogen atmosphere for 2 hours at 110° C.

(ii) Preparation of indium chloride precursor: Indium chloride precursor, 0.5 mmol, is dispersed in 10 mL of 1-octadecene solvent, and then heated with stirring under vacuum at 110° C. for 1 hour. The temperature is then lowered to 25° C.

(iii) Mixing and reaction of 386-InP MSCs with indium chloride: 20 mL of the 386-InP MSCs solution prepared in step (i) is mixed with the indium chloride solution prepared in step (ii) at room temperature. The mixed solution is then heated to 110° C. under a nitrogen atmosphere for about 3 hours.

Figure 17:
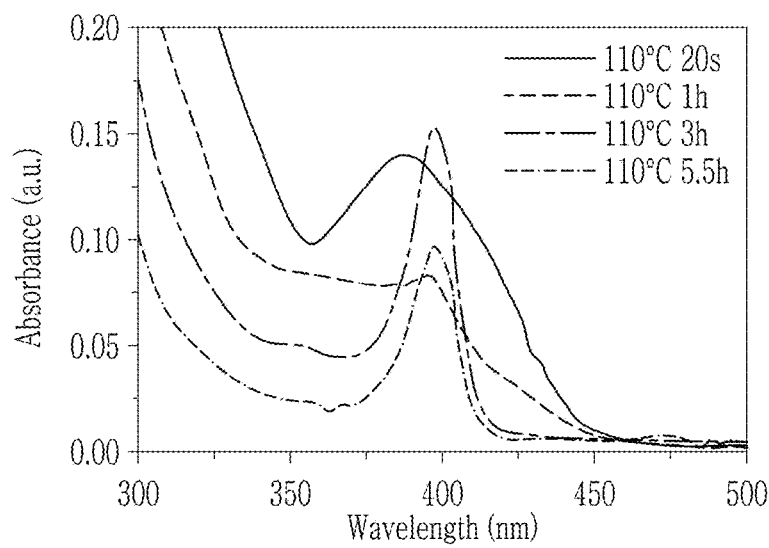
FIG. 17 is a plot of absorption spectra of nanoclusters prepared over time by heating and reacting 386-InP MSCs with indium chloride at 110° C. through the chemical conversion method according to (2) of Example 4.

The F399-InP:Cl nanoclusters exhibit a similar structure and characteristics as those of the nanoclusters prepared using the molecular precursor method of Example 4, and therefore, the F399-InP:Cl nanoclusters may be prepared through a chemical conversion method of reacting 386-InP MSCs and indium chloride at 110° C. As shown in FIG. 17, one observes changes in the absorption spectra of the nanoclusters with reaction time using 386-InP MSCs and 56 mole equivalents of indium chloride at 110° C. through the chemical conversion method.

Figure 18:
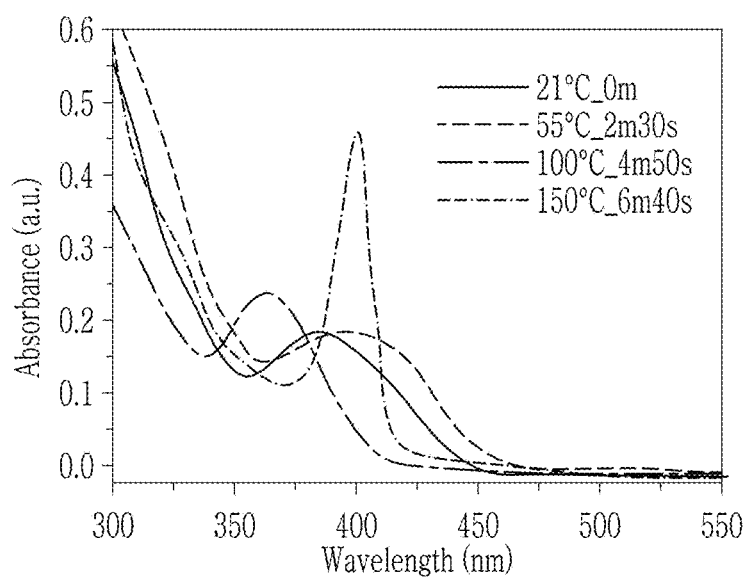
FIG. 18 is a plot of absorption spectra over time of nanoclusters prepared by mixing 386-InP MSCs and indium chloride at room temperature through the chemical conversion method according to (2) of Example 4, and then increasing the temperature.

FIG. 18 shows the differences in the absorption spectra over time of the mixed solution of the 386-InP MSCs and 56 mole equivalents of indium chloride at different reaction conditions (time and temperature). Referring to FIG. 18, when the solution is heated at 100° C. for 4 minutes and 50 seconds, the InP:Cl nanoclusters exhibit a unique absorption peak at about 360 nm, much like the F360-InP:Cl nanoclusters described in Example 5 (see, below). Upon further heating to 150° C. for an additional 6 minutes and 40 seconds, F399-InP:Cl nanoclusters are prepared with the same maximum absorption peak at about 399 nm as that of the nanoclusters prepared by using the molecular precursor method of Example 4.

The results of analyzing the composition of the F399-InP:Cl nanoclusters synthesized in the chemical synthesis through ICP-AES are shown in Table 4.

TABLE 4

| Atomic % | InCl$_3$/386-MSCs | In$^a$ | P$^a$ | Cl$^a$ | MA$^b$ |
|---|---|---|---|---|---|
| 386-MSCs | — | 1.0 | 0.54 | — | 1.4 |
| F399-MSCs | 56 | 1.0 | 0.48 | 0.45 | 1.1 |
| | 112 | 1.0 | 0.53 | 0.69 | 0.72 |
| | 280 | 1.0 | 0.48 | 0.88 | 0.4 |
| | 560 | 1.0 | 0.56 | 0.79 | 0.53 |

As shown in Table 4, the 386-InP MSCs used as a precursor include no chlorine. However, chlorine is present in the F399-InP:Cl nanoclusters prepared by reacting 386-InP MSCs with indium chloride. In the latter, as the mole equivalents of the indium chloride added relative to that of 386-InP MSCs is increased, the chlorine content of the prepared F399-InP:Cl nanoclusters also increases.

Figure 19:
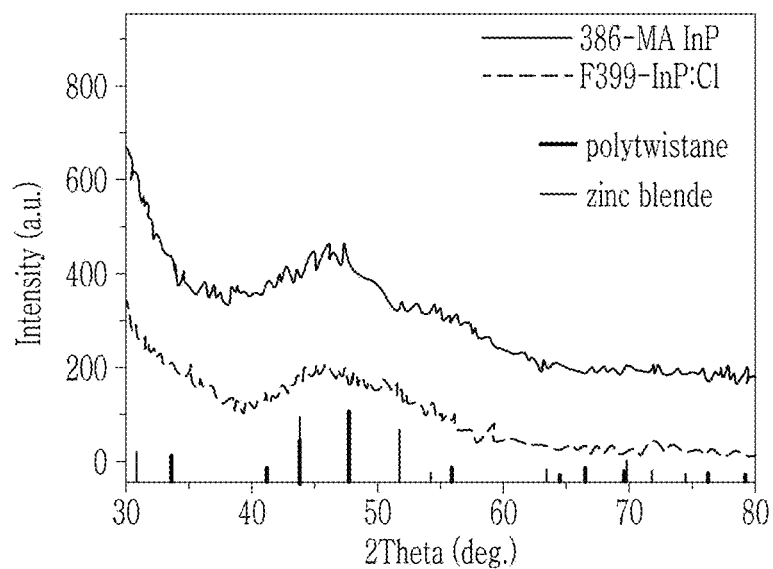
FIG. 19 is an X-ray diffraction (XRD) graph of F399-InP:Cl nanoclusters prepared by the chemical conversion method according to (2) of Example 4 and 386-InP MSCs as a precursor.

FIG. 19 is an XRD graph of the synthesized F399-InP:Cl nanoclusters and 386-InP MSCs used as precursors. Referring to FIG. 19, both 386-MSCs and F399-InP:Cl nanoclusters exhibit a zinc-blende type structure.

Figure 20:
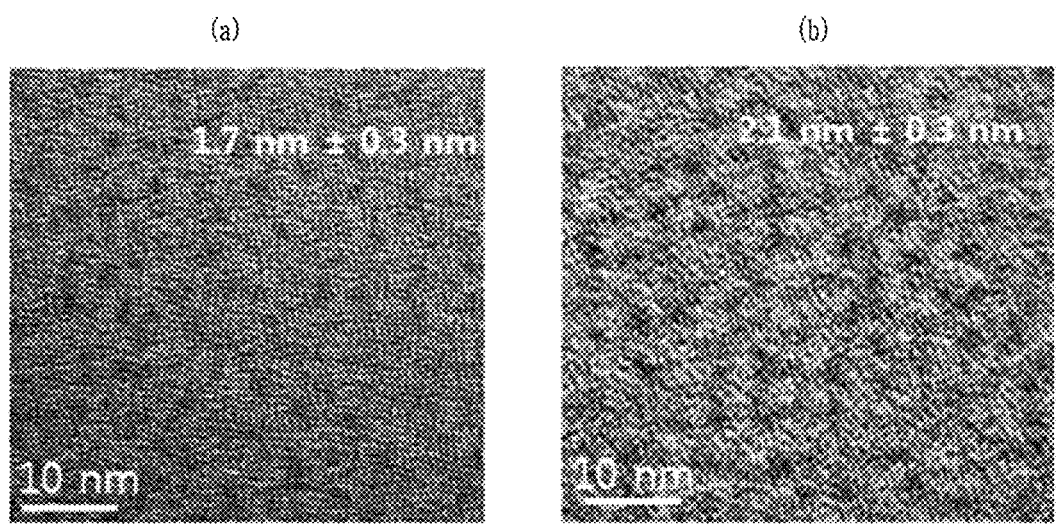
FIG. 20 is a transmission electron microscope (TEM) photograph of F399-InP:Cl nanoclusters ((b) of FIG. 20) and precursor 386-InP MSCs ((a) of FIG. 20) prepared by the chemical conversion method according to (2) of Example 4.

FIG. 20 is TEM photographs showing 386-InP MSCs used as a precursor ((a) of FIG. 20) and the synthesized F399-InP:Cl nanoclusters ((b) of FIG. 20). Referring to the (b) of FIG. 20, the F399-InP:Cl nanoclusters have a size of about 2.1 nm±0.3 nm, which is larger than about 1.7 nm±0.3 nm of that of 386-InP MSCs in the (a) of FIG. 20.

Example 5: Synthesis and Characterization of F360-InP:Cl Nanoclusters (1) Synthesis of F360-InP:Cl Nanoclusters Using Molecular Precursors F360-InP:Cl nanoclusters are prepared, according to the same method as Example 4, by first reacting indium acetate (In(Ac)$_3$) as an indium precursor and myristic acid (MA) to obtain indium myristate (In(MA)$_3$), and then reacting the indium myristate (In(MA)$_3$) with tris(trimethylsilyl)phosphine (TMS$_3$P) as a phosphorus precursor and indium chloride (InCl$_3$) as a chlorine precursor. The specific reaction process is as follows.

(i) Synthesis of indium myristate: Indium acetate, 0.8 mmol, and 2.4 mmol of myristic acid are dispersed in 10 mL of 1-octadecene (ODE) solvent, and then the reaction solution is heated with stirring at 110° C. under vacuum for 2 hours.

(ii) Preparation of indium chloride: Indium chloride, 0.5 mmol, is dispersed in 10 mL of 1-octadecene solvent, and the solution is heated with stirring under vacuum at 110° C. for 1 hour. The temperature is then lowered to 80° C.

(iii) Mixing and reaction of indium precursor, chlorine precursor, and phosphorus precursor: The indium myristate solution prepared in step (i) is mixed with the indium chloride solution of step (ii) under a nitrogen atmosphere. A phosphorus precursor solution prepared by dispersing 0.4 mmol of tris(trimethylsilyl)phosphine in 0.5 mL of a 1-octadecene solvent is then added to the mixed indium solution, and the resulting mixture is heated at 80° C. for about 6 hours to prepare semiconductor nanoclusters including indium, phosphorus, and chlorine.

Figure 21:
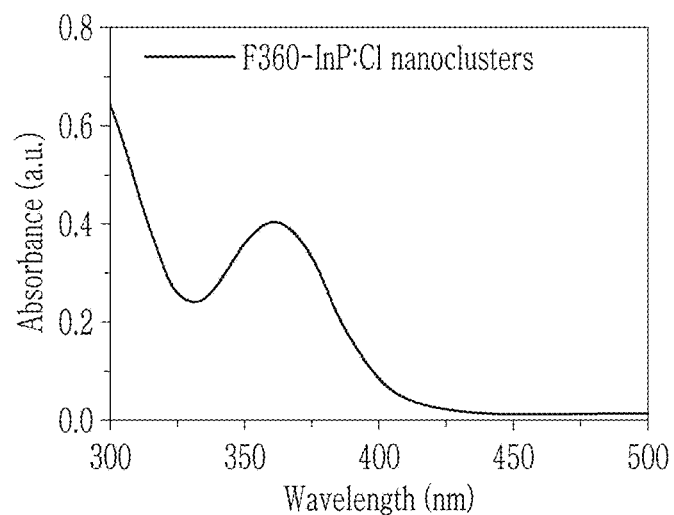
FIG. 21 is an absorption spectrum of F360-InP:Cl nanoclusters prepared by the molecular precursor synthesis method according to (1) of Example 5.

An absorption spectrum of the prepared nanoclusters is shown in FIG. 21. This result confirms that the F360-InP:Zn nanoclusters have a maximum absorption peak wavelength of about 360 nm.

Figure 22:
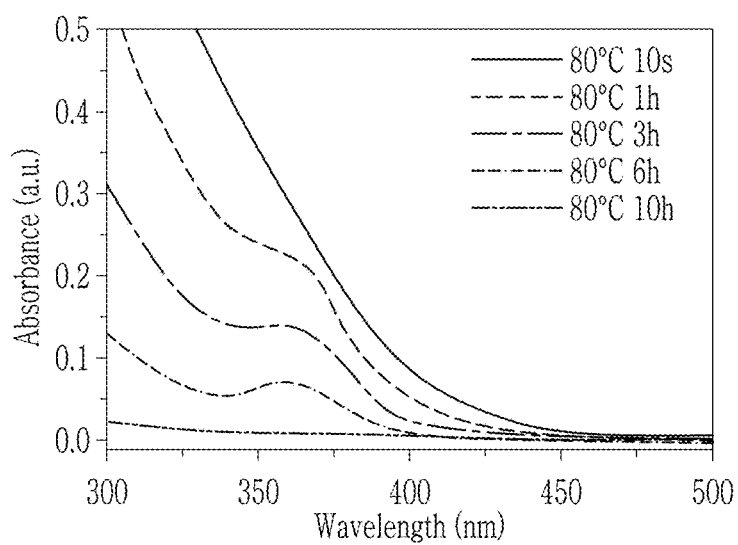
FIG. 22 is a plot of absorption spectra showing the growth changes of the F360-InP:Cl nanoclusters prepared by the molecular precursor synthesis method according to (1) of Example 5.

FIG. 22 shows changes in the absorption spectra of formed particles over time as the indium precursor, the chlorine precursor, and the phosphorus precursor are heated and reacted at 80° C. Referring to FIG. 22, the InP:Cl nanoclusters become more defined with time and could be said to have a thermodynamically and optically stable shape at 6 hours.

(2) Synthesis of F360-InP:Cl Nanoclusters Through Chemical Conversion

The same InP-based semiconductor nanoclusters as the F360-InP:Cl nanoclusters are prepared by using the molecular precursors of the Example 5 above through a chemical conversion method, and using magic-sized InP nanoclusters with an absorption peak at a wavelength of about 386 nm, that is, 386-InP MSCs as a precursor and reacting them with a chlorine precursor. The specific reaction process is as follows.

(i) Synthesis of 386-InP MSCs: Indium acetate, 0.8 mmol, and 2.9 mmol of myristic acid are dispersed in 20 mL of an 1-octadecene solvent and the mixture is heated to 110° C. Tris(trimethylsilyl)phosphine, 0.4 mmol, is added to the solution at 110° C. under a nitrogen atmosphere for 2 hours.

(ii) Preparation of indium chloride precursor: Indium chloride precursor, 0.5 mmol, is dispersed in 10 mL of 1-octadecene solvent, and heated with stirring under vacuum at 110° C. for 1 hour. The temperature is then lowered to 25° C.

(iii) Mixing and reaction of 386-InP MSCs with indium chloride: 20 mL of the 386-InP MSCs solution prepared in step (i) is mixed with the indium chloride solution prepared in step (ii) at room temperature. The solution is then heated to 80° C. for about 18 hours under a nitrogen atmosphere.

Figure 23:
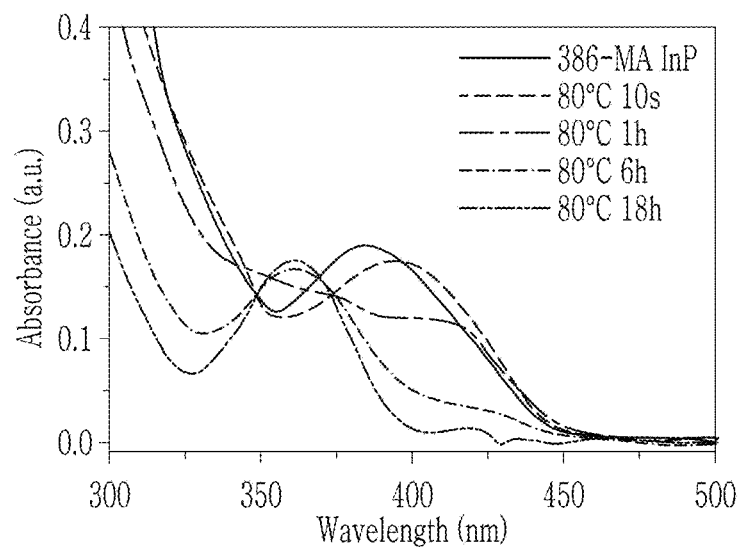
FIG. 23 is a plot of absorption spectra of nanoclusters prepared over time by heating and reacting 386-InP MSCs with 56 equivalents of indium chloride at 80° C. through the chemical conversion method according to (2) of Example 5.

F360-InP:Cl nanoclusters having the same structure and characteristics as those of the nanoclusters prepared in the molecular precursor method of Example 5 may be synthesized through a chemical conversion method of mixing 386-InP MSCs with indium chloride at room temperature and heating the mixture up to 80° C. for 18 hours. FIG. 23 shows the changes in the absorption spectra of the nanoclusters prepared with the 386-InP MSCs and 56 equivalents of indium chloride through the chemical conversion method. Referring to FIG. 23, following the reaction at 80° C. for 18 hours, similar F360-InP:Cl nanoclusters as the nanoclusters synthesized in the molecular precursor method of Example 4 above are obtained.

The results of analyzing the composition of the F360-InP:Cl nanoclusters prepared in the chemical synthesis through ICP-AES are shown in Table 5.

TABLE 5

| Atomic % | InCl$_3$/ 386-MSCs | In$^a$ | P$^a$ | Cl$^a$ | MA$^b$ |
|---|---|---|---|---|---|
| 386-MSCs | — | 1.0 | 0.54 | — | 1.4 |
| F360-MSCs | 56 | 1.0 | 0.32 | 0.38 | 1.7 |
|  | 112 | 1.0 | 0.30 | 0.54 | 1.5 |
|  | 280 | 1.0 | 0.52 | 0.67 | 0.77 |
|  | 560 | 1.0 | 0.54 | 0.64 | 0.74 |

As shown from Table 5, 386-InP MSCs used as a precursor includes no chlorine. In contrast, chlorine is present in the F360-InP:Cl nanoclusters prepared by reacting 386-InP MSCs with indium chloride. As indicated in Table 5, as the mole equivalents of the indium chloride added relative to that of 386-InP MSCs is increased, the chlorine content in the F360-InP:Cl nanoclusters also increases.

Figure 24:
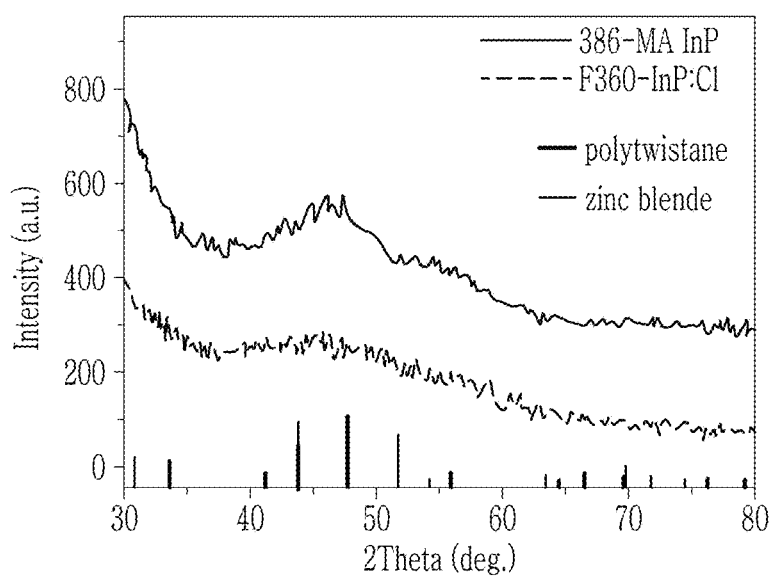
FIG. 24 is an X-ray diffraction (XRD) graph of F360-InP:Cl nanoclusters prepared by the chemical conversion method according to (2) of Example 5 and 386-InP MSCs as a precursor.

FIG. 24 is an XRD graph of the synthesized F360-InP:Cl nanoclusters when the 386-InP MSCs are used as precursors. From FIG. 24, 386-InP MSCs exhibit a zinc blende type structure, whereas F399-InP:Cl nanoclusters exhibit a polytwistane type structure.

Figure 25:
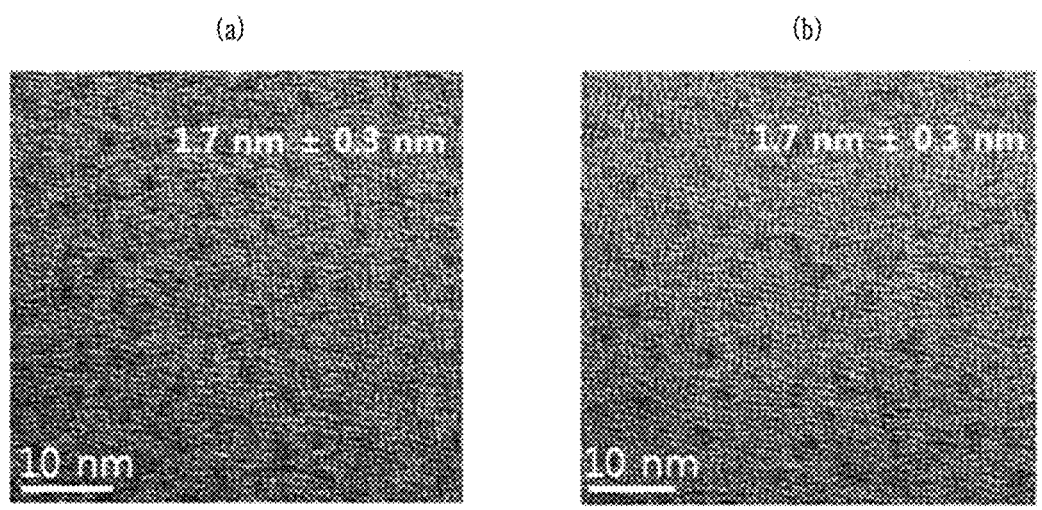
FIG. 25 is transmission electron microscope (TEM) photograph of F360-InP:Cl nanoclusters ((b) of FIG. 25) and precursor 386-InP MSCs ((a) of FIG. 25) prepared by the chemical conversion method according to (2) of Example 5.

FIG. 25 is TEM photographs showing 386-InP MSCs used as a precursor ((a) of FIG. 25) and the synthesized F360-InP:Cl nanoclusters ((b) of FIG. 25). Referring to the (a) and (b) of FIG. 25, 386-InP MSCs and the F360-InP:Cl nanoclusters all exhibit a similar size of 1.7 nm±0.3 nm.

Above, the method for synthesizing InP-based nanoclusters including indium, zinc, and optionally, further including zinc and/or chlorine prepared according to an embodiment, and optical properties, structures, and sizes of the synthesized InP-based nanoclusters are described. Such InP-based nanoclusters are useful as precursors for preparing InP-based nanoparticles having a homogeneous size and/or a controlled shape. In addition, these nanoclusters are less toxic because they are easily excreted in vivo due to the ultra-small sizes and thus advantageous when used as diagnostic agents or probes in the in-vivo imaging field. Moreover, the nanoclusters exhibit strong quantum-limiting effects, and thus, may be used as a material for absorbing sunlight in a solar cell field. Furthermore, these nanoclusters exhibit a light emitting peak over 400 nm to 800 nm including emission due to trap levels, and thus, may be used as an emitter of white light LED.

While this disclosure has been described in connection with what is presently considered to be practical example embodiments, it is to be understood that the invention is not limited to the disclosed embodiments. On the contrary, it is intended to cover various modifications and equivalent arrangements included within the spirit and scope of the appended claims.

What is claimed is:

1. InP-based nanoclusters comprising indium, phosphorus, and chlorine.

2. The InP-based nanoclusters of claim 1 further comprising zinc.

3. The InP-based nanoclusters of claim 2, wherein the zinc is present in an amount of about 10 mole percent to about 40 mole percent relative to moles of indium.

4. The InP-based nanoclusters of claim 1 exhibiting a maximum absorption peak at the wavelength of about 399 nanometers.

5. The InP-based nanoclusters of claim 4, wherein a half-width at half-maximum of the maximum emission peak is less than or equal to about 10 nanometers.

6. The InP-based nanoclusters of claim 1 exhibiting a maximum absorption peak at the wavelength of about 360 nanometers.

7. The InP-based nanoclusters of claim 1 further comprising zinc, wherein the chlorine is present in an amount of less than or equal to about 90 mole percent relative to moles indium.

8. The InP-based nanoclusters of claim 7, wherein the chlorine is present in an amount of less than or equal to about 88 mole percent relative to moles indium.

9. The InP-based nanoclusters of claim 7, wherein the chlorine is present in an amount of less than or equal to about 67 mole percent relative to moles indium.

10. A method of preparing InP-based nanoparticles comprising heating the InP-based nanoclusters of claim 1 in an organic solvent.

11. The method of claim 10, further comprising adding a first precursor material including indium, and a second precursor material including phosphorus, and optionally, adding a third precursor material including zinc, optionally, adding a fourth precursor material including chlorine, or optionally, adding the third and the fourth precursor materials, to the organic solvent that includes the InP-based nanoclusters of claim 1 while being heated.

12. A method of preparing the InP-based nanoclusters of claim 1, the method comprising:

adding a first precursor material including indium, a second precursor material including phosphorus, and a precursor material including chlorine, to an organic solvent to form a reaction mixture; and heating the mixture to form the InP:Cl nanoclusters at a temperature of greater than or equal to about 70° C.

13. The method of claim 12, further comprising adding a precursor material including zinc to the organic solvent.

14. A method of preparing the InP-based nanoclusters of claim 1, the method comprising:
    adding a precursor material including indium and a precursor material including phosphorous to an organic solvent and heating the mixture at 110° C. to provide InP-based nanoclusters including indium and phosphorus,
    adding a precursor material including chlorine to the InP-based nanoclusters to form a reaction mixture, and heating the reaction mixture at 110° C.

15. The method of claim 14, wherein the addition of the precursor material including chlorine to the InP-based nanoclusters is at room temperature.

16. InP:Zn nanoclusters comprising indium, phosphorus, and zinc;
    wherein
    the InP:Zn nanoclusters exhibit a maximum absorption peak at a wavelength of about 393 nanometers with a half-width at half-maximum of the maximum emission peak that is less than or equal to about 15 nanometers;
    the InP:Zn nanoclusters exhibit a maximum absorption peak at a wavelength of about 408 nanometers with a half-width at half-maximum of the maximum emission peak that is less than or equal to about 20 nanometers; or
    the InP:Zn nanoclusters exhibit a maximum absorption peak at a wavelength of about 360 nanometers with a half-width at half-maximum of the maximum emission peak that is less than or equal to about 30 nanometers.

17. The InP:Zn nanoclusters of claim 16, wherein the maximum absorption peak is at a wavelength of about 393 nanometers and the half-width at half-maximum of the maximum emission peak is less than or equal to about 15 nanometers.

18. The InP:Zn nanoclusters of claim 16, wherein the maximum absorption peak is at a wavelength of about 408 nanometers and the half-width at half-maximum of the maximum emission peak is less than or equal to about 20 nanometers.

19. The InP:Zn nanoclusters of claim 16, wherein the maximum absorption peak is at a wavelength of about 360 nanometers and the half-width at half-maximum of the maximum emission peak is less than or equal to about 15 nanometers.

* * * * *